United States Patent

Nagata et al.

[11] Patent Number: 5,886,740
[45] Date of Patent: Mar. 23, 1999

[54] CAMERA APPARATUS WITH DETAIL ENHANCEMENT PROCESSING

[75] Inventors: Kazuhiro Nagata; Tadamasa Kurashige, both of Kanagawa, Japan

[73] Assignee: Sony Corporation, Tokyo, Japan

[21] Appl. No.: 511,706

[22] Filed: Aug. 4, 1995

[30] Foreign Application Priority Data

Aug. 5, 1994 [JP] Japan .................................. 6-184932

[51] Int. Cl.$^6$ .................................................. H04N 9/09
[52] U.S. Cl. ........................................ 348/265; 348/312
[58] Field of Search .................................. 348/264, 265, 348/317, 262, 263, 319, 252.3, 312, 617, 71, 625, 605, 627, 628, 629, 630; 382/254, 266, 82, 167

[56] References Cited

U.S. PATENT DOCUMENTS

| | | | |
|---|---|---|---|
| 4,106,056 | 8/1978 | Nagumo et al. | 348/265 |
| 4,244,003 | 1/1981 | Poetsch et al. | 348/265 |
| 4,527,193 | 7/1985 | Onga et al. | 348/266 |
| 4,635,116 | 1/1987 | Hirota et al. | 348/714 |
| 4,672,430 | 6/1987 | Asaida | 348/265 |
| 4,809,061 | 2/1989 | Suzuki | 348/265 |
| 4,835,594 | 5/1989 | Kihara | 348/265 |
| 5,019,895 | 5/1991 | Yamamoto et al. | 348/609 |
| 5,113,247 | 5/1992 | Akiyama et al. | 348/263 |
| 5,184,212 | 2/1993 | Yamamoto et al. | 348/265 |
| 5,187,582 | 2/1993 | Higashitsutsumi | 348/239 |
| 5,227,869 | 7/1993 | Degawa | 348/607 |
| 5,307,158 | 4/1994 | Tsuruta et al. | 348/265 |
| 5,406,330 | 4/1995 | Fukushima et al. | 348/265 |
| 5,432,563 | 7/1995 | Kasahara | 348/629 |
| 5,521,637 | 5/1996 | Asaida et al. | 348/165 |

*Primary Examiner*—Wendy Garber
*Assistant Examiner*—Aung S. Moe
*Attorney, Agent, or Firm*—Limbach & Limbach LLP; Seong-Kun Oh

[57] ABSTRACT

A camera apparatus which can perform detail enhancement on a selected set of color signals. Fundamental color signals are respectively detected by a plurality of imaging devices and output in response to vertical transfer signals. For color signals on which detail enhancement is not to be performed, the vertical transfer pulse is sent to the corresponding imaging device at a reference timing. For the selected color signals on which detail enhancement is to be performed, the vertical transfer pulse is sent to the corresponding imaging device at a timing which is ahead of the reference timing. In one embodiment, vertical transfer pulses of the reference timing are generated, and additional pulses which are ahead of the reference timing are also generated. In another embodiment, vertical transfer pulses are continuously generated, but some pulses are selectively suppressed or subtracted to produce pulses of two different timings.

20 Claims, 14 Drawing Sheets

CAMERA APPARATUS WITH DETAIL ENHANCEMENT PROCESSING

BACKGROUND OF THE INVENTION

The present invention relates to a camera apparatus and, more particularly to a 3-chip color video camera having a vertical detail enhancement function, for example.

3-chip video cameras have hitherto been known as color video cameras. A 3-chip video camera includes a dichroic prism disposed behind a camera lens for analyzing incident light from an object to provide three primary colors R (red), G (green), B (blue). Three solid-state imaging devices of the same size are disposed at the positions in which light rays thus analyzed by the dichroic prism are focused. The R, G and B color signals are respectively obtained from outputs of the three solid-state imaging devices.

According to this system, since optical paths of three primary colors R, G and B are independent, it is possible to freely correct colors by using filters, called trimming filters, disposed on the optical paths. As a consequence, optimal imager characteristics can be obtained with ease and reproduced color images will have satisfactory tonal value.

Recently, in order to compensate for deterioration in responses of a solid-state imaging device or to enhance sharpness, horizontal and vertical detail enhancement (compensating) processing has become available.

In particular, vertical detail enhancement processing uses a method called the RGB pixel shift method or the RGB image shift method. By way of example, when a detail is enhanced by using the R signal and the G signal (referred to hereinafter simply as "RG detail") for example, according to the RGB image shift method, the positions of R-channel and G-channel solid-state imaging devices are shifted by one pixel pitch (i.e., one line amount) relative to the reference position of B-channel solid-state imaging device.

Specifically, when the solid-state imaging devices are bonded to the dichroic prism, the B-channel solid-state imaging device is bonded to the prism such that the center of its image region is aligned with an optical axis of the prism for the color blue. The R-channel and G-channel solid-state imaging devices are bonded to the dichroic prism such that centers thereof are respectively shifted in the amount of one line in the vertical direction from the corresponding red and green optical axes of the prism, thereby realizing the RGB image shift method corresponding to the RG detail.

A principle of RG detail processing will be described with reference to FIG. 1 which shows an imager model in a CCD (charge-coupled device) solid-state imaging device of a FIT (frame interline transfer) system.

As shown in FIG. 1 of the accompanying drawings, a mark is picked up by imager portions of the R-channel and the G-channel at their imager regions at a position ranging from the Nth line to the N+3th line. Meanwhile, because the B-channel solid-state imaging device is shifted downwards by one line in the vertical direction, relative to the R-channel and G-channel solid-state imaging devices, the B-channel imager portion will pick up the same mark on its imager region at a position ranging from the N+1th line to the N+4th line.

During the next vertical blanking period, the signal charge thus picked up is transferred from the imager portion to the storage portion. The storage portions of the R-channel and the G-channel store signal charges corresponding to the mark at a position from the Nth line to N+3th line. The storage portion of the B-channel stores signal charges corresponding to the mark at a position from the N+1th line to N+4th line.

As a consequence, during the next effective horizontal scanning period, a signal charge of every line is transferred to a horizontal register at every horizontal blanking period. Due to the position of the image data picked up by the R-channel solid-state imaging device and the G-channel solid-state imaging device, these image data are read out earlier than image data picked up by the B-channel solid-state imaging device by one horizontal scanning period (1H). The R-channel and G-channel solid-state imaging devices output signals of −1H relative to an output signal of the B-channel solid-state imaging device.

The RG detail signal processing will be described below. The RG detail signal processing is effected by a detail enhancement circuit shown in FIG. 2. As shown in FIG. 2, the detail enhancement circuit is composed of two 1H delay circuits {circuits-for delaying signals by one horizontal scanning period: first 1H delay circuits (101R, 101G) and second 1H delay circuits (102R, 102G)} connected in series to imager signal lines for carrying out a detail enhancement processing (detail processing). The detail enhancement circuit further includes 3-input adding circuits (103R, 103G) connected to the 1H delay circuits 102R, 102G and amplifiers 104R, 104G). The amplifiers 104R, 104G have a gain of 2, and are connected between junctions (aR, aG) of the first 1H delay circuits (101R, 101G) and the second 1H delay circuits (102R, 102G) and the 3-input adding circuits (103R, 103G).

An R signal Sr(−1) of −1H is supplied to the first 1H delay circuit 101R from the preceding stage R-channel solid-state imaging device 105R through a contact bR of the preceding stage. An R signal Sr(0) of 0H from the first 1H delay circuit 101R is supplied to the second 1H delay circuit 102R. The R signal Sr(−1) of −1H from the contact bR and an R signal 2Sr(0) of 0H whose signal level was amplified by a factor of two by the amplifier 104 are supplied to the 3-input adding circuit 103R. An R signal Sr(1) of 1H from the second delay circuit 102R also is supplied to the 3-input adding circuit 103R. The 3-input adding circuit 103R calculates [2Sr(0)−(Sr(−1)+Sr(1))] to output a detail enhanced R signal dSr. This detail enhanced R signal dSr is output at an output terminal 106Ra of the 3-input adding circuit 103R.

FIG. 3 shows changes in the waveforms of signals obtained when the detail enhancement processing is carried out. The normal R signal Sr(0) of 0H is delivered to an output terminal 106Rb through a main signal line 107R led out from the contact aR.

In the G-channel, similarly, a G signal Sg(−1) of −1H is supplied to the first 1H delay circuit 101G from the preceding stage G-channel solid-state imaging device 105G through a contact bG of the preceding stage. A G signal Sg(0) of 0H from the first 1H delay circuit 101G is supplied to the second 1H delay circuit 102G. The G signal Sg(−1) of −1H from the contact bG and a G signal 2Sg(0) of 0H whose signal level was amplified by a factor of two by an amplifier 104G are supplied to a 3-input adding circuit 103G. Further, a G signal Sg(1) of 1H from the second delay circuit 102G also is supplied to the 3-input adding circuit 103G.

The 3-input adding circuit 103G calculates [2Sr(0)−(Sr(−1)+Sr(1))] to output a detail enhanced G signal dSg. This G signal dSg is output at an output terminal 106Ga of the 3-input adding circuit 103G. The normal G signal Sg(0) of 0H is delivered to an output terminal 106Gb through a main signal line 107G led out from the contact aG.

In the B-channel, a B signal (B signal of 0H) Sb(0) from the B-channel solid-state imaging device 105B is delivered to an output terminal 106B*b* through a main signal line 107B without detail enhancement processing.

As described above, in the detail enhancement circuit, the two 3-input adding circuits 103R and 103G output the detail enhanced R signal dSr and the detail enhanced G signal dSg. The normal R signal Sr(0) of 0H, the normal G signal Sg(0) and the normal B signal Sb(0) are output from the main signal lines 107R, 107G and 107B, respectively. Therefore, it becomes possible to compensate for deterioration of response in the high frequency band in the solid-state imaging device.

In the detail enhancement processing, however, the solid-state imaging device(s) (e.g. 105R, 105G or 105B) for outputting the color signals to be detail-enhanced are mechanically bonded to the dichroic prism at a physical position shifted by one pixel pitch relative to a corresponding position for a solid-state imaging device for outputting a color signal which is not detail-enhanced or in an opposite positional relationship. Because the position of mechanical bonding determines which color signals may be detail-enhanced, the set of color signals which can be detail-enhanced is limited to one form when the camera apparatus is designed or manufactured.

Specifically, when the form of the RG detail shown in FIGS. 1 and 2 is changed to RGB detail form or G detail form, for example, the solid-state imaging devices 105R, 105G and 105B that had been bonded to the dichroic prism would have to be detached and bonded again to the dichroic prism at positions conforming to the desired detail form. Therefore, to change the detail form is very difficult and the selection of the detail form is limited accordingly.

To solve the above-mentioned problem, it is proposed to exchange the entire CCD block to thereby change between various detail forms. Under this proposal, there would be a multiplicity of CCD blocks, prepared in advance, in which the solid-state imaging devices are bonded to the dichroic prism according to each kind of detail form.

There are however seven detail forms, i.e., R, G, B, RG, RB, GB and RGB. Therefore, seven CCD blocks would need to be kept in stock in order to cope with the change of detail form. This would take much time and labor and would make the camera apparatus very expensive. Moreover, even when the solid-state imaging devices are mechanically bonded to the dichroic prism by an automation system, in order to manufacture the seven CCD blocks, a very small positional displacements must be accommodated. For instance, small positional displacements, such as one line amount of the imager region, would have to be determined and the solid-state imaging devices would have to be bonded to the dichroic prism with great accuracy in order to properly account for these small positional displacements. As a result, the manufacturing process becomes complex, the number of processes is increased and the manufacturing cost is increased.

SUMMARY OF THE INVENTION

In view of the aforesaid, it is an object of the present invention to provide a camera apparatus in which the user can easily change the detail form of a detail enhancement processing according to an object, a background or the user's preference. It is an object of the present invention to extend the extent to which the user can select image processing functions.

It is another object of the present invention to provide a camera apparatus in which solid-state imaging devices can all be bonded to the prism at positions in the vertical direction corresponding to the same phase, regardless of the detail form, thereby allowing a common CCD blocks which can be used for various detail forms.

According to a first aspect of the present invention, a camera apparatus includes a plurality of solid-state imaging devices respectively disposed receive a fundamental color. Each solid-state imaging device respectively outputs a color signal corresponding to its received fundamental colors at a timing based on vertical transfer signals.

The camera apparatus of the first aspect further includes a pulse generating circuit system for supplying vertical transfer pulses to each solid-state imaging device. The pulse generating circuit includes a vertical transfer pulse generating circuit for generating vertical transfer pulses of a reference phase based on a horizontal synchronizing signal, a vertical synchronizing signal and a system clock. The pulse generating circuit further includes a phase control circuit is supplied with the vertical transfer pulses of the reference phase from the vertical transfer pulse generating circuit and advances the phase of a vertical transfer pulse which is supplied to at least one of the solid state imaging devices.

The camera apparatus of the first aspect further includes a detail enhancement signal generating circuit which receives the color signals output by the solid-state imaging devices and performs detail enhancement on the color signal received from the at least one solid state imaging device which is supplied with the vertical transfer pulse that is advanced in phase by the phase control circuit.

According to a second aspect of the present invention, a camera apparatus includes a plurality of CCD's (charge coupled devices). Each of the plurality of CCD's provides an image signal and has vertical transfer registers for transferring charges in response to vertical transfer pulses. Each of the CCD's also has a horizontal transfer register for transferring charges in response to horizontal transfer pulses.

The camera apparatus according to the second aspect of the invention further includes pulse generating means for generating the vertical transfer pulses and the horizontal transfer pulses for each the plurality of CCD's. A number of vertical transfer pulses for at least a first CCD of the plurality of CCD's is different from the number of vertical transfer pulses for the other CCD's.

The camera apparatus according to a second aspect of the present invention further includes image enhancement means supplied with the image signal from the first CCD for delaying the input image signal for one and two horizontal scanning periods to generate a first delayed image signal delayed by one horizontal scanning period from the input image signal, a second delayed image signal delayed by two horizontal scanning periods from the input image signal. The image enhancement means processes the input image signal, the first delayed image signal and the second delayed image signal to generate an enhanced image signal having a phase equal to the phase of the first delayed image signal so that the phase of the enhanced image signal from the first CCD is as same as that of the image signal from the other CCD's.

According to a third aspect of the present invention, a camera apparatus includes a plurality of charged coupled devices each disposed to receive a different color and outputting a color signal in response to a vertical transfer pulse the camera apparatus further includes a first generator for generating first vertical transfer pulses having a first phase, and a second generator for generating second vertical transfer pulses having a second phase. The second phase is ahead of the first phase the camera apparatus further includes a synthesizer for selectively supplying and second vertical transfer pulses to each of the plurality of charged coupled devices. The camera apparatus further includes a detail enhancement circuit which receives the color signals from the charge coupled devices and performs detail enhancement on only the color signals output in response to second vertical transfer pulses.

DETAILED DESCRIPTION OF THE PREFERRED EMBODIMENTS

Figure 1:
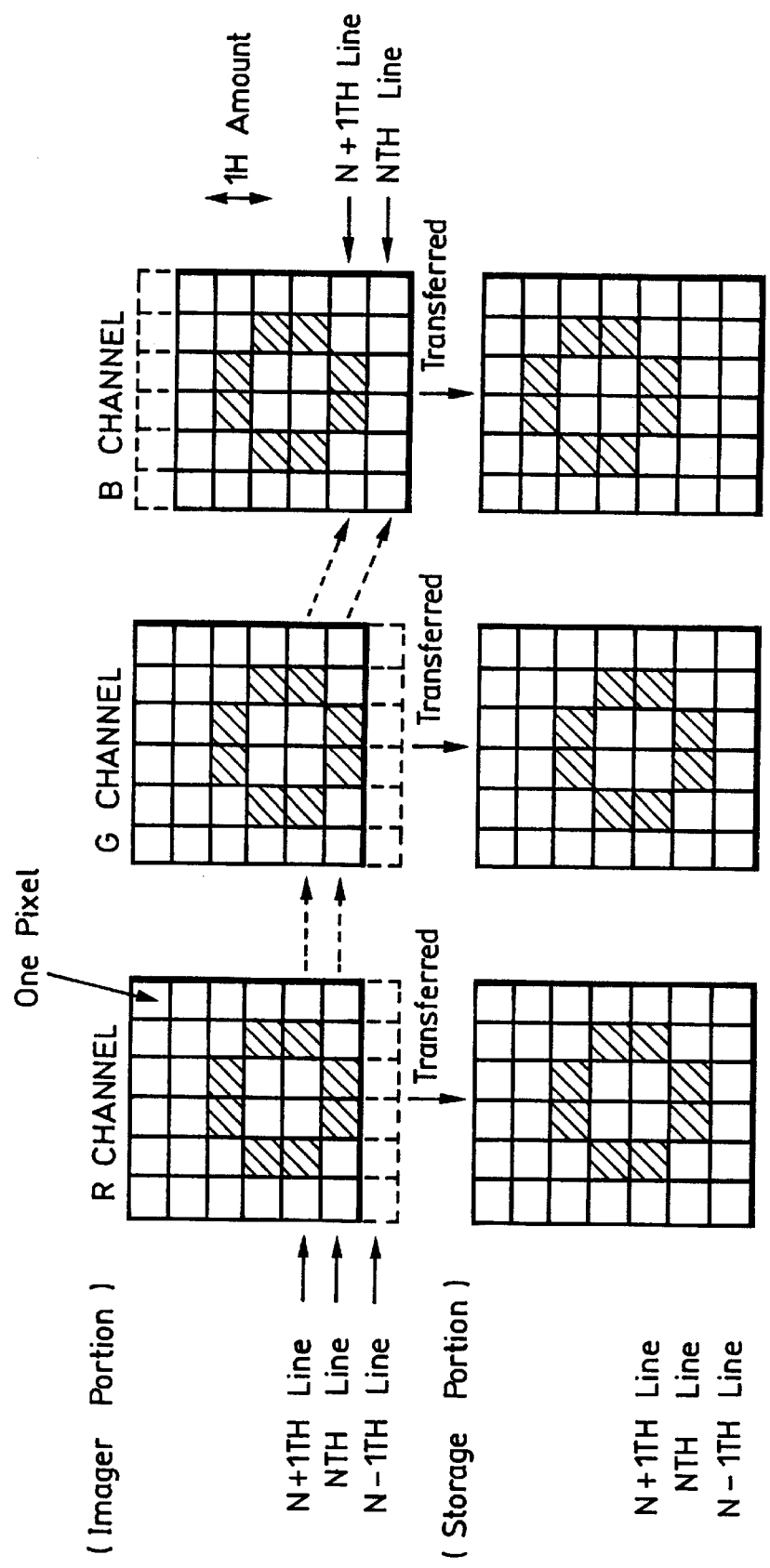
FIG. 1 is a schematic diagram showing charge transferred states of three solid-state imaging devices according to a mechanical RGB pixel shift method in a video camera.
Figure 2:
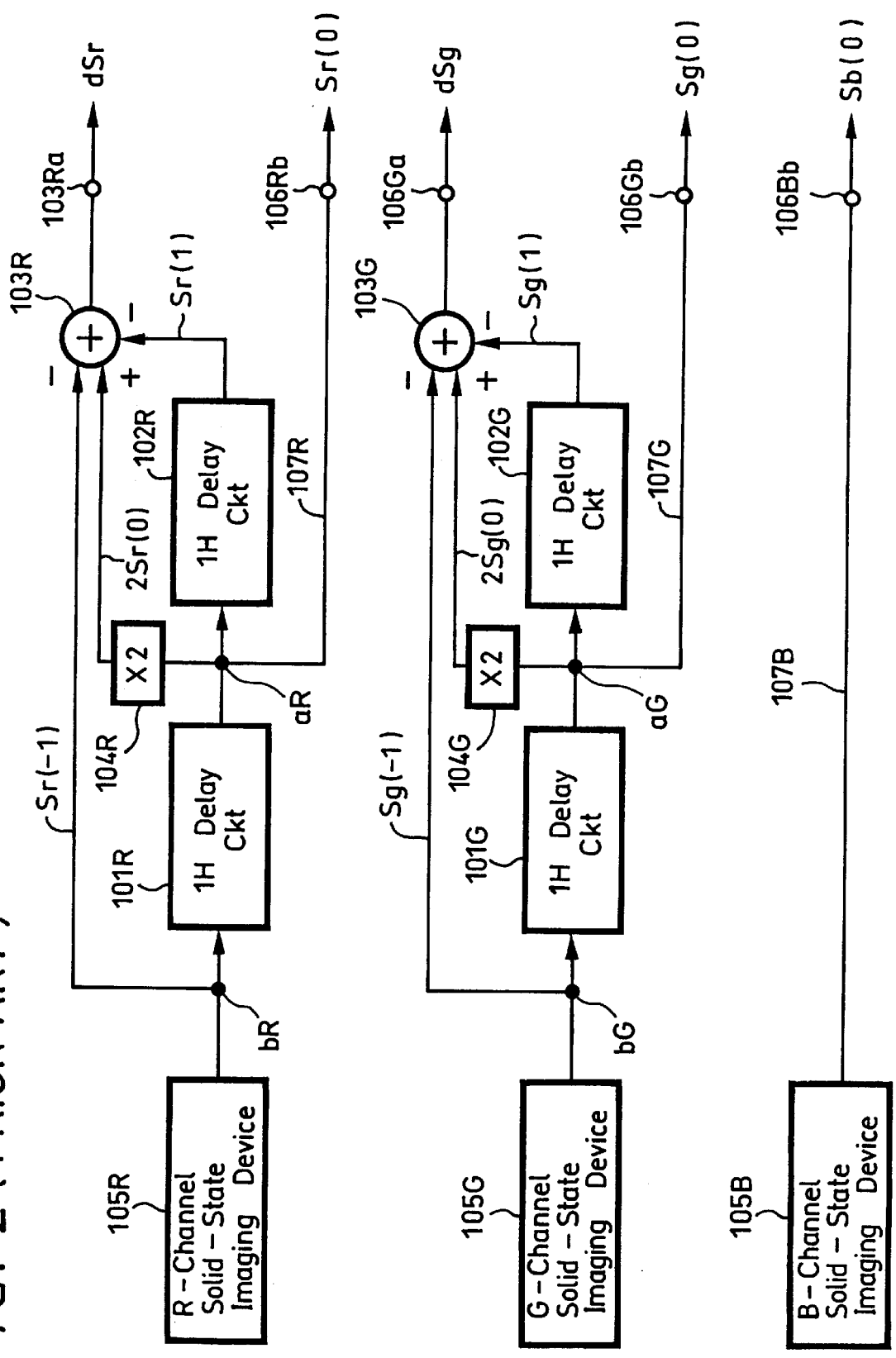
FIG. 2 is a block diagram showing an arrangement of a detail enhancement processing circuit assembled in the video camera.
Figure 3:
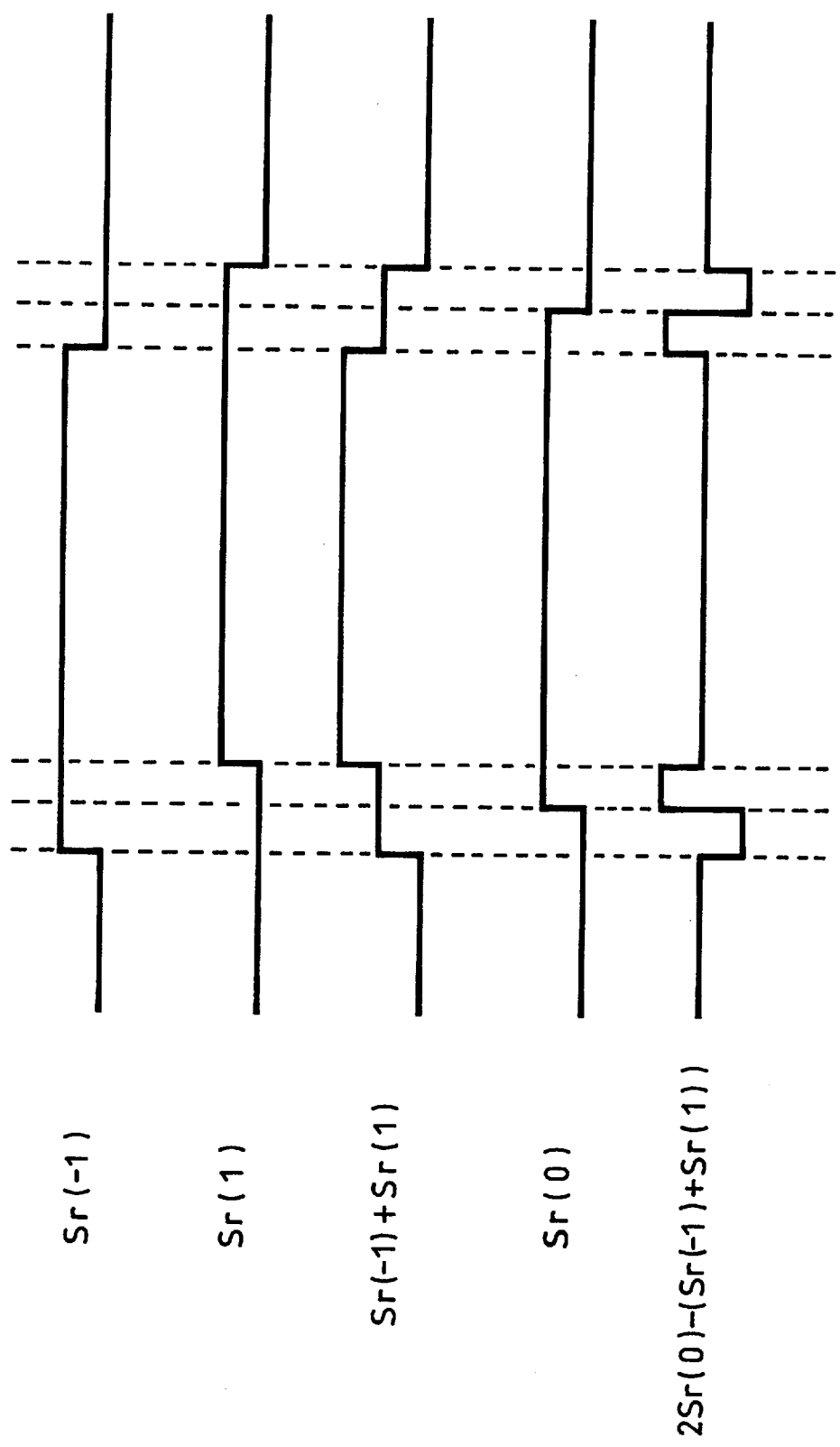
FIG. 3 is a diagram of waveforms of signals used to explain a detail enhancement processing of color signals.

Two embodiments in which a camera apparatus according to the present invention are applied to a 3-chip color video camera having FIT system CCD solid-state imaging devices mounted thereon will be described below with reference to FIGS. 4 to 14. The above-mentioned 3-chip color video cameras will hereinafter be referred to as "first inventive video camera" and "second inventive video camera," respectively.

A solid-state imaging device mounted on the first inventive camera apparatus is composed of an imager portion 3 in which a number of light-receiving portions 1 are disposed in a matrix fashion for photoelectrically-converting incident light to electric charges corresponding in amount to the intensity of incident light. A number of vertical registers 2 are disposed in columns adjacent to the light-receiving portions 1. A storage portion 5 adjoins and is formed as a part of the imager portion 3. A plurality of vertical registers 4 correspond in number to the vertical registers 2 in the imager portion 3.

This solid-state imaging device includes one horizontal register H adjoining the storage portion 5 and which is made common for a plurality of vertical registers 4.

The solid-state imaging device includes two vertical-horizontal registers VH1 and VH2 disposed common to and in parallel to a number of vertical registers 4. The two vertical-horizontal registers VH1 and VH2 are disposed between the storage portion 5 and the horizontal register H in order to transfer signal charges transferred to the final stage of the vertical register 4 in the storage portion 5 to the horizontal register H. Vertical-horizontal transfer pulses $\phi$VH1 and $\phi$VH2 are supplied to the two vertical-horizontal registers VH1 and VH2. The two vertical-horizontal registers VH1 and VH2 transfer signal charges from the vertical registers 4 to the horizontal register H in response to the transfer pulses $\phi$VH1 and $\phi$VH2 supplied thereto.

An output portion 6 is connected to the final stage of the horizontal register H. The output portion 6 includes a charge-to-electrical signal converting portion 7 formed of some suitable means, such as a floating diffusion or a floating gate. The charge-to-electrical signal converting portion 7 converts the signal charge transferred thereto from the final stage of the horizontal register H into an electrical signal (e.g., voltage signal). The output portion 6 further includes a reset gate RG for discharging the signal charge, which was converted into an electrical signal (by the charge-to-electrical signal converting portion 7) to a drain region D in response to a reset pulse Pr input thereto. The output portion 6 further includes an amplifier 8 for amplifying the electrical signal supplied thereto from the charge-to-electrical signal converting portion 7. A power supply voltage Vdd is applied to the drain region D.

Four vertical transfer electrodes each made of bilayer polycrystalline silicon layers are formed on the vertical register 2 in the imager portion 3 and on the vertical register 4 in the storage portion 5 through insulating films (not shown). Specifically, the four vertical transfer electrodes constitute one set and a large number of such sets of four vertical transfer electrodes are sequentially arranged in the longitudinal direction. Four vertical transfer pulses $\phi$IM1 to $\phi$IM4 with different phases are respectively supplied to a set of four vertical transfer electrodes on the imager portion 3, respectively. Four vertical transfer pulses $\phi$ST1 to $\phi$ST4 with different phases are respectively supplied to a set of four vertical transfer electrodes in the storage portion 5.

Figure 5:
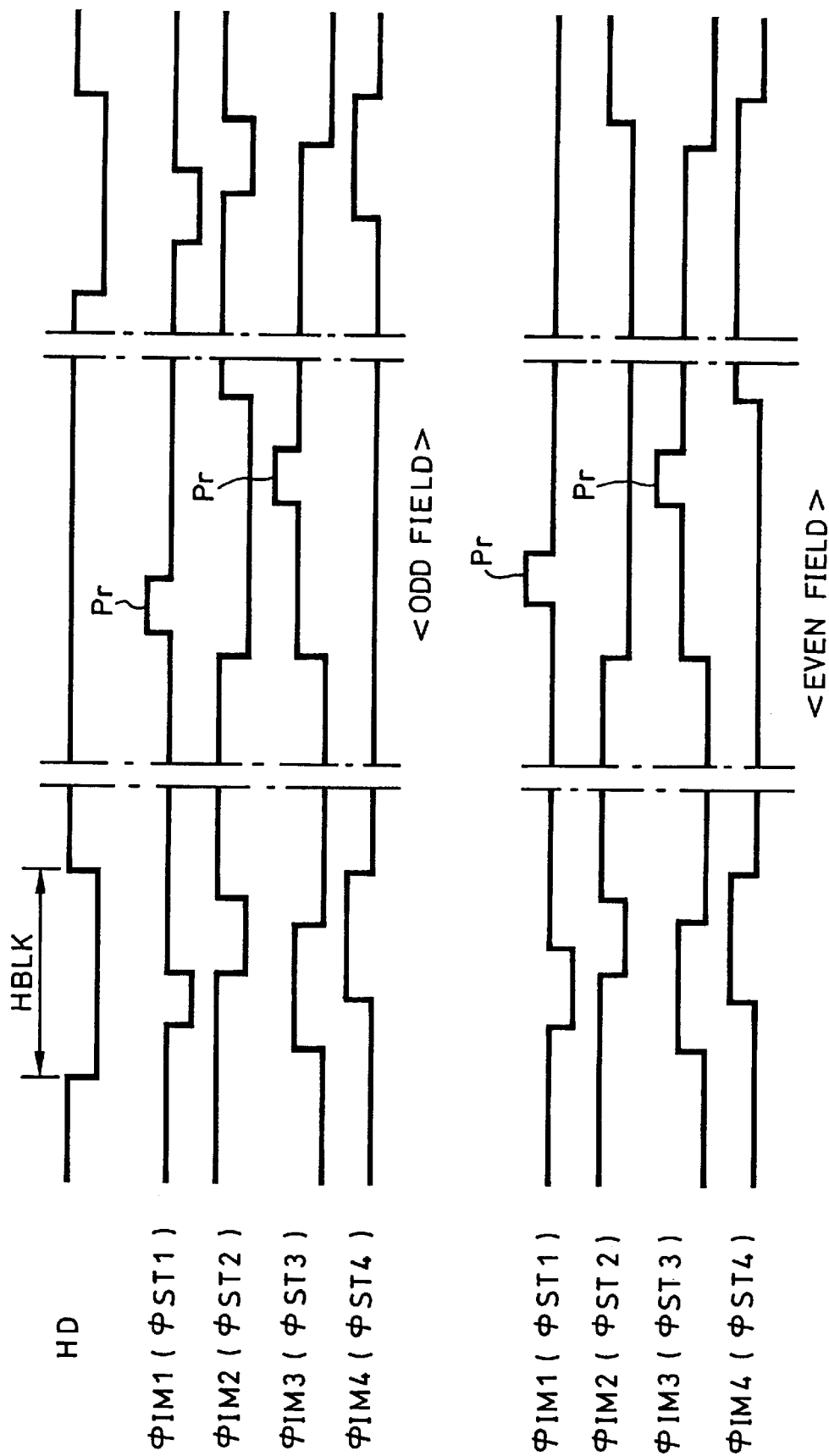
FIG. 5 is a timing chart showing examples of vertical transfer pulses applied to the solid-state imaging devices.

FIG. 5 is a timing chart showing examples of the vertical transfer pulses $\phi$IM1 to $\phi$IM4 ($\phi$ST1 to $\phi$ST4). The vertical transfer pulses $\phi$IM1 to $\phi$IM4 ($\phi$ST1 to $\phi$ST4) are modified to pulse waveforms with different phases during a period of a horizontal sync (synchronizing) signal HD, in particular, during a horizontal blanking period HBLK. The signal charge transferred to the vertical register 4 in the storage portion 5 is transferred to the corresponding horizontal register H at the unit of one row in accordance with the change of phases.

The vertical transfer pulses φIM1 through φIM4 (φST1 through φST4) change the phases of pulse waveforms during an odd-field and an even-field. When the four vertical transfer pulses φIM1 to φIM4 are supplied to the four vertical transfer electrodes in the imager portion 3 and the four vertical transfer pulses φST1 to φST4 are supplied to the four vertical transfer electrodes in the storage portion 5, potential distributions under the vertical transfer electrodes in the imager portion 3 and the storage portion 5 are changed sequentially. In this way, signal charges are transferred in the vertical direction (to the horizontal register H side) along the vertical registers 2 in the imager portion 3 and the vertical registers 4 in the storage portion 5.

Figure 4:
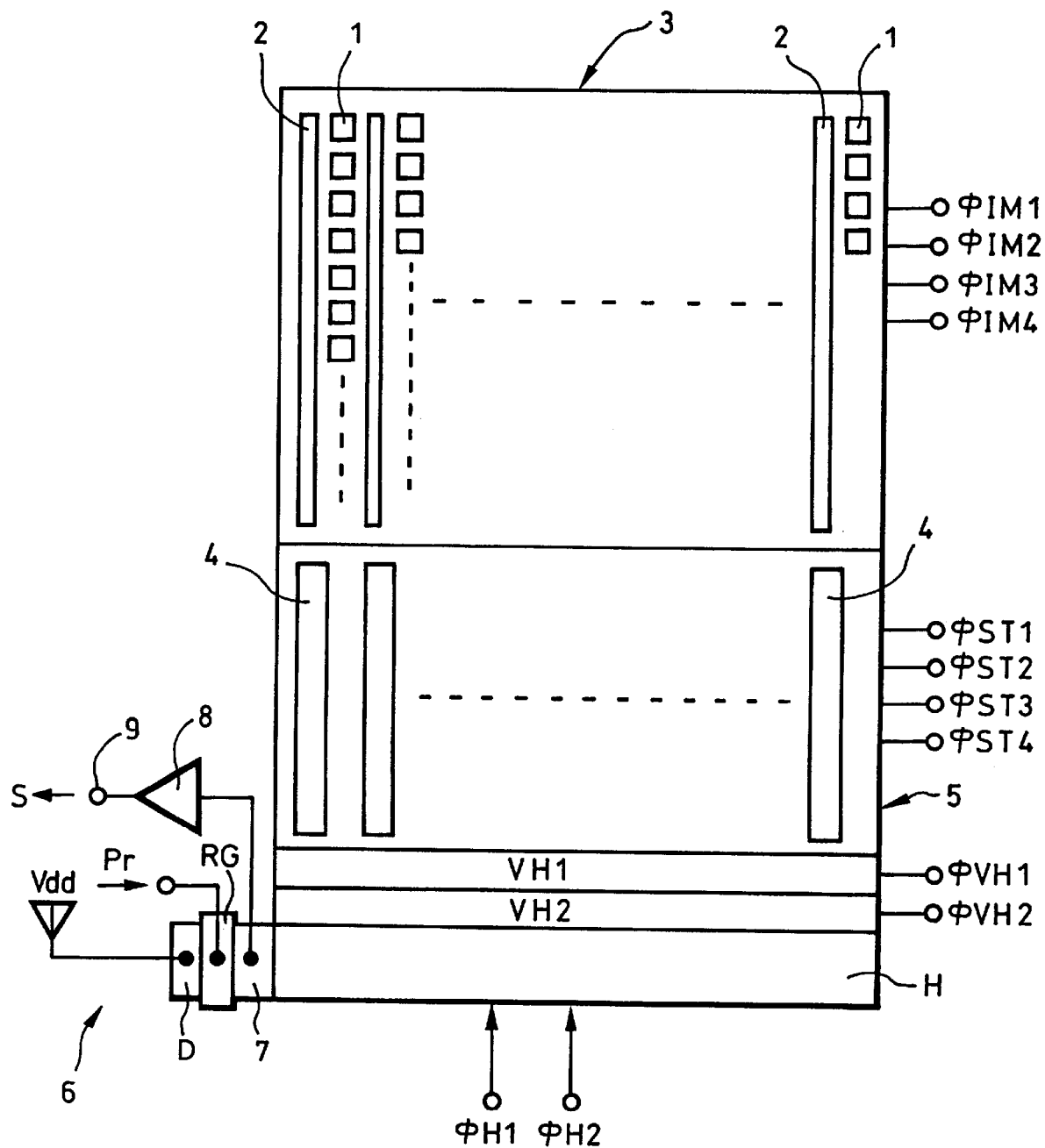
FIG. 4 is a plan view schematically showing an arrangement of a solid-state imaging device mounted on a first embodiment in which a camera apparatus according to the present invention is applied to a 3-chip color video camera having FIT (frame interline transfer) type CCD solid-state imaging devices (this video camera will hereinafter be referred to as "first inventive video camera")

Referring to FIG. 4 and FIG. 5, in operation, the imager portion 3 reads out signal charges stored in the light-receiving portion 1 to the vertical register 2 during the vertical blanking period and then transfers signal charges transferred to the vertical register 2 at a high speed to the vertical register 4 in the storage portion 5 during the vertical blanking period.

The storage portion 5 transfers the signal charge transferred to the vertical register 4 during the vertical blanking period to the horizontal register H during the next vertical blanking period HBLK, whereby the signal charge stored in the final stage of the vertical register 4 is transferred through the two vertical-horizontal registers VH1 and VH2 to the horizontal register H.

During the next horizontal scanning period, two-phase horizontal transfer pulses φH1 and φH2 with different phases are applied to horizontal transfer electrodes. Each horizontal transfer electrode is made of bilayer polycrystalline silicon layers formed on the horizontal register H. In this way, a signal charge is sequentially transferred to the charge-to-electrical signal converting portion 7 on the output portion 6 side. Then, the signal charge is converted by the charge-to-electrical signal converting portion 7 into an electrical signal, amplified by the amplifier 8 and delivered from an output terminal 9 as an imager signal S.

The first inventive video camera includes a dichroic prism disposed behind a camera lens to analyze incident light from an object to provide three primary colors of R, G and B. The three solid-state imaging devices of the same size are respectively disposed at the positions at which light rays analyzed by the dichroic prism are focused. Then, the R, G and B color signals are respectively obtained from the outputs of the three solid-state imaging devices. The solid-state imaging devices include detail enhancement processing circuits assembled into the rear output stages thereof in order to carry out the vertical detail enhancement (compensating) processing to compensate for deterioration in the response of the solid-state imaging device or to emphasize sharpness. The detail enhancement processing circuit will be described below in detail.

Figure 6:
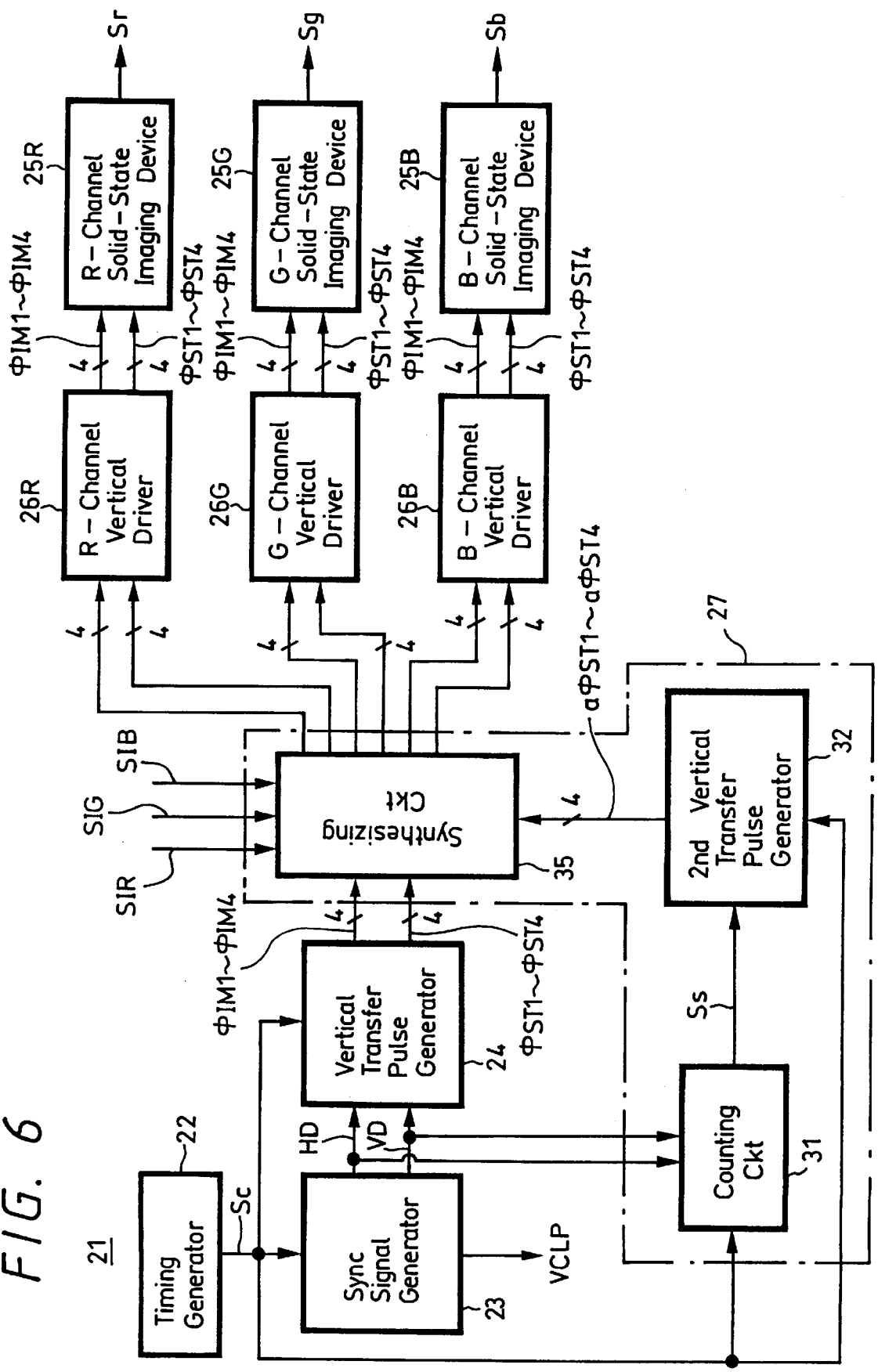
FIG. 6 is a block diagram showing an arrangement of a pulse generating circuit system of the first inventive video camera.

The vertical transfer pulses supplied to the solid state imaging devices are generated by a pulse generating circuit system 21 shown in FIG. 6. As FIG. 6 shows, the pulse generating circuit system 21 includes a timing oscillator or generator 22 for generating a system clock signal Sc determined in accordance with the specification of the video camera. The pulse generating circuit system 21 further includes a sync signal generator 23 for generating a horizontal sync signal HD and a vertical sync signal VD based on the system clock Sc supplied thereto from the timing oscillator 22. The pulse generating circuit system 21 further includes a vertical transfer pulse generator 24 for generating the vertical transfer pulses φIM1 to φIM4 (φST1 to φST4) based on: (1) the system clock Sc supplied thereto from the timing oscillator 22, and (2) the horizontal sync signal HD and the vertical sync signal VD supplied thereto from the sync signal generator 23. The pulse generating circuit system further includes vertical drivers (26R, 26G, 26B) connected to the front stages of the solid-state imaging devices (25R, 25G, 25B) in response to the solid-state imaging devices (25R, 25G, 25B). The vertical drivers (26R, 26G, 26B) amplify the vertical transfer pulses φIM1 to φIM4 (φST1 to φST4) supplied thereto from the vertical transfer pulse generator 24 by a predetermined gain.

In the first inventive video camera, between the vertical transfer pulse generator 24 and the vertical drivers (26R, 26G, 26B) is connected a phase control circuit 27. The phase control circuit 27 advances the phases of the vertical transfer pulses supplied to the solid-state imaging devices in order to output a target color signal which is to be enhanced in detail.

Figure 7:
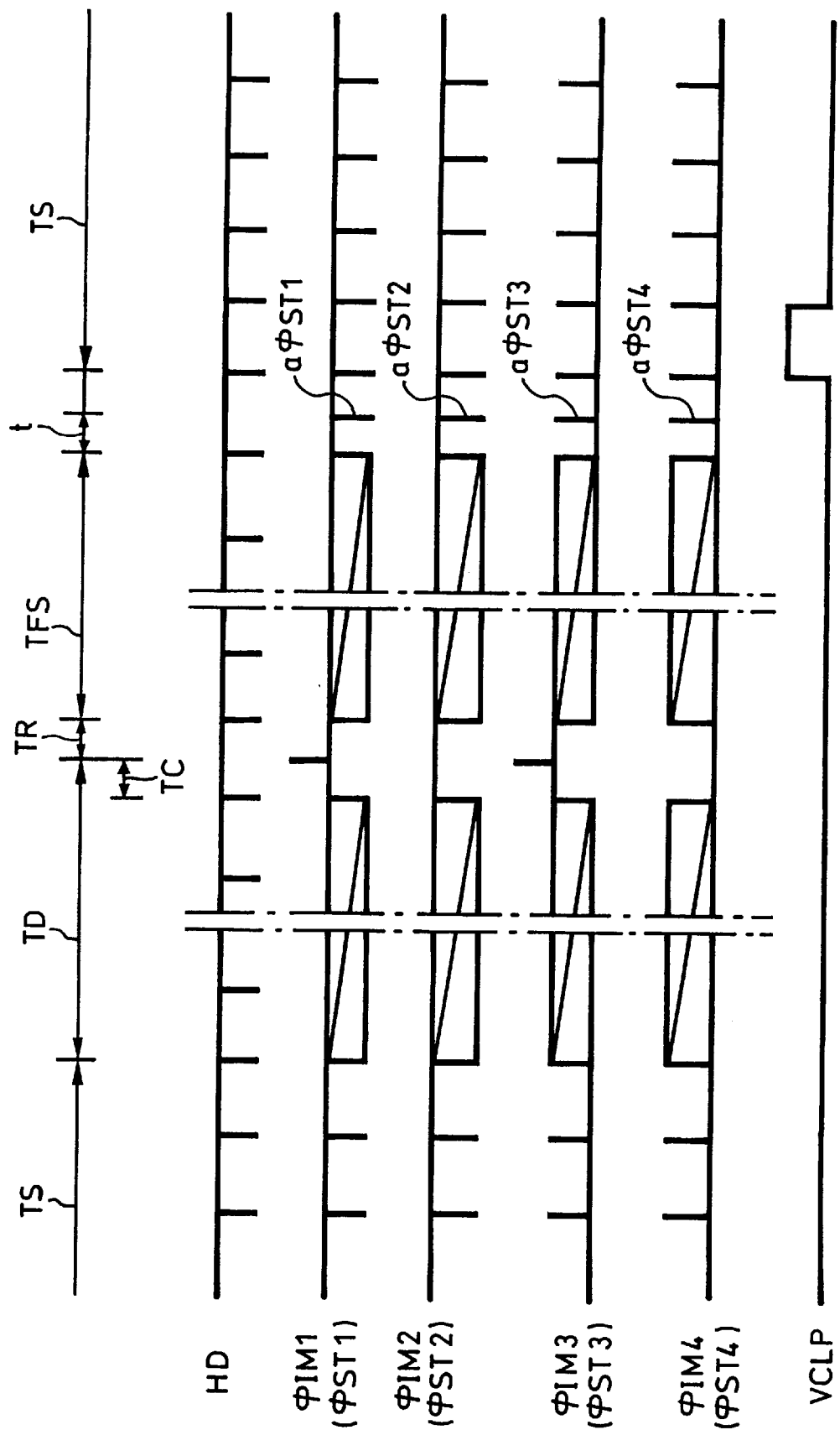
FIG. 7 is a timing chart showing examples of vertical transfer pulses applied to a solid-state imaging device of the first inventive video camera whose output color signal is to be enhanced in detail.

As shown in a timing chart of FIG. 7, there is a frame shift period TFS (period during which all signal charges stored in the imager portion 3 are transferred to the storage portion 5) following a charge read period TR. In order to transfer signal charges in the storage portion 5 to the horizontal register H at every row, after the frame shift period TFS, the vertical transfer pulses φIM1 to φIM4 (φST1 to φST4) are supplied to the storage portions 5 of the solid-state imaging devices (25R, 25G, 25B). The phase control circuit 27 supplies additional vertical transfer pulses aφIM1 to aφIM4 (aφST1 to aφST4) to only the target solid-state imaging device whose output color signal is to be enhanced in detail before the first horizontal sync signal HD (vertical blanking period HBLK) is supplied thereto after the frame shift period TFS had elapsed.

Reference levels (black levels) of the solid-state imaging devices 25R, 25G and 25B are respectively determined based on a vertical clamping pulse VLCP output from existing clamping circuits connected to the solid-state imaging devices (25R, 25G, 25B) at the same time that the sync signal generator 23 generates the first horizontal sync signal HD.

Specifically, as shown in FIG. 6, the phase control circuit 27 includes a counting circuit 31 for counting a predetermined period t following the frame shift period TFS on the basis of: (1) the system clock Sc supplied thereto from the timing oscillator 22, and (2) the horizontal sync signal HD and the vertical sync signal VD supplied thereto from the sync signal generator 24. The counting circuit 31 outputs a start timing signal Ss at the completion of the counting. The phase control circuit 27 further includes a second vertical pulse generator 32 for generating and outputting the additional vertical transfer pulses aφIM1 to aφIM4 (aφST1 to aφST4) based on the start timing signal Ss input thereto from the counting circuit 31. The phase control circuit 27 further includes a synthesizing circuit 35 for synthesizing the additional vertical transfer pulses aφIM1 to aφIM4 (aφST1 to aφST4) from the second vertical transfer pulse generator 32 with the vertical transfer pulses φIM1 to φIM4 (φST1 to φST4) from the vertical transfer pulse generator 24. The synthesizer 35 outputs synthesized pulses (aφIM1 to aφIM4 and φIM1 to φIM4) only to the solid state imaging devices whose output is to be enhanced in detail. The synthesizer 35 outputs only the vertical transfer pulses (φIM1 to φIM4 (φST1 to φST4)) to the other solid state imaging devices.

Figure 8:
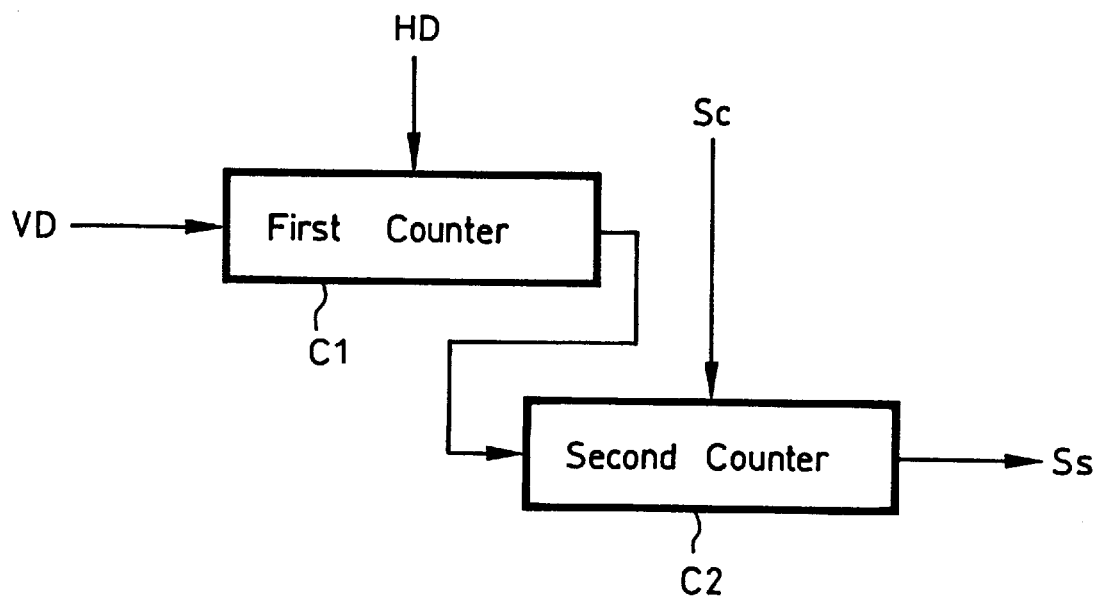
FIG. 8 is a block diagram showing an arrangement of a counting circuit of the a phase control circuit of the first inventive video camera.

The counting circuit 31 includes therein two counters (first and second counters C1 and C2) as shown in FIG. 8. The first counter C1 is formed of a counter for sequentially counting the horizontal sync signal HD supplied to a clock terminal thereof based on the input of the vertical sync signal VD supplied to a reset input terminal thereof. The first counter C1 outputs a carry output after having counted the horizontal sync signal HD supplied when the frame shift period TFS is ended. The second counter C2 is formed of a counter for sequentially counting the system clock Sc supplied to the clock terminal thereof based on the carry output input supplied thereto from the first counter C1. The second counter C2 outputs a carry output after having counted the system clock Sc during the predetermined time t required until the next horizontal sync signal HD is supplied from the sync signal generator 23.

The second vertical transfer pulse generator 32 generates and outputs additional vertical transfer pulses aφIM1 to aφIM4 (aφST1 to aφST4). These additional vertical transfer pulses aφIM1 to aφIM4 (aφST1 to aφST4) have the same signal waveforms as the vertical transfer pulse waveforms with phases changed during the horizontal blanking period HBLK from the vertical transfer pulses shown in FIG. 5. The second vertical transfer pulse generator 32 generates additional vertical transfer pulses aφIM1 to aφIM4 (aφST1 to aφST4) based on the vertical sync signal HD input thereto from the timing oscillator 22 and the start timing signal Ss input thereto from the counting circuit 31. The odd field and the even field can be discriminated on the basis of data indicative of the number with which the vertical sync signal VD is input. The second vertical transfer pulse generator 32 generates and outputs the additional vertical transfer pulses aφIM1 to aφIM4 (aφST1 to aφST4) corresponding to the odd or even field on the basis of data indicative of the number with which the vertical sync signal VD is input thereto.

Since the solid-state imaging device mounted on the first inventive video camera is of the FIT type, there are required 8 vertical transfer pulses. In actual practice, the second vertical transfer pulse generator 24 generates and outputs only four vertical transfer pulses (e.g., φST1 to φST4) because the vertical transfer pulses are branched by signal branching lines connected to the rear stage as will be described later on.

Figure 9:
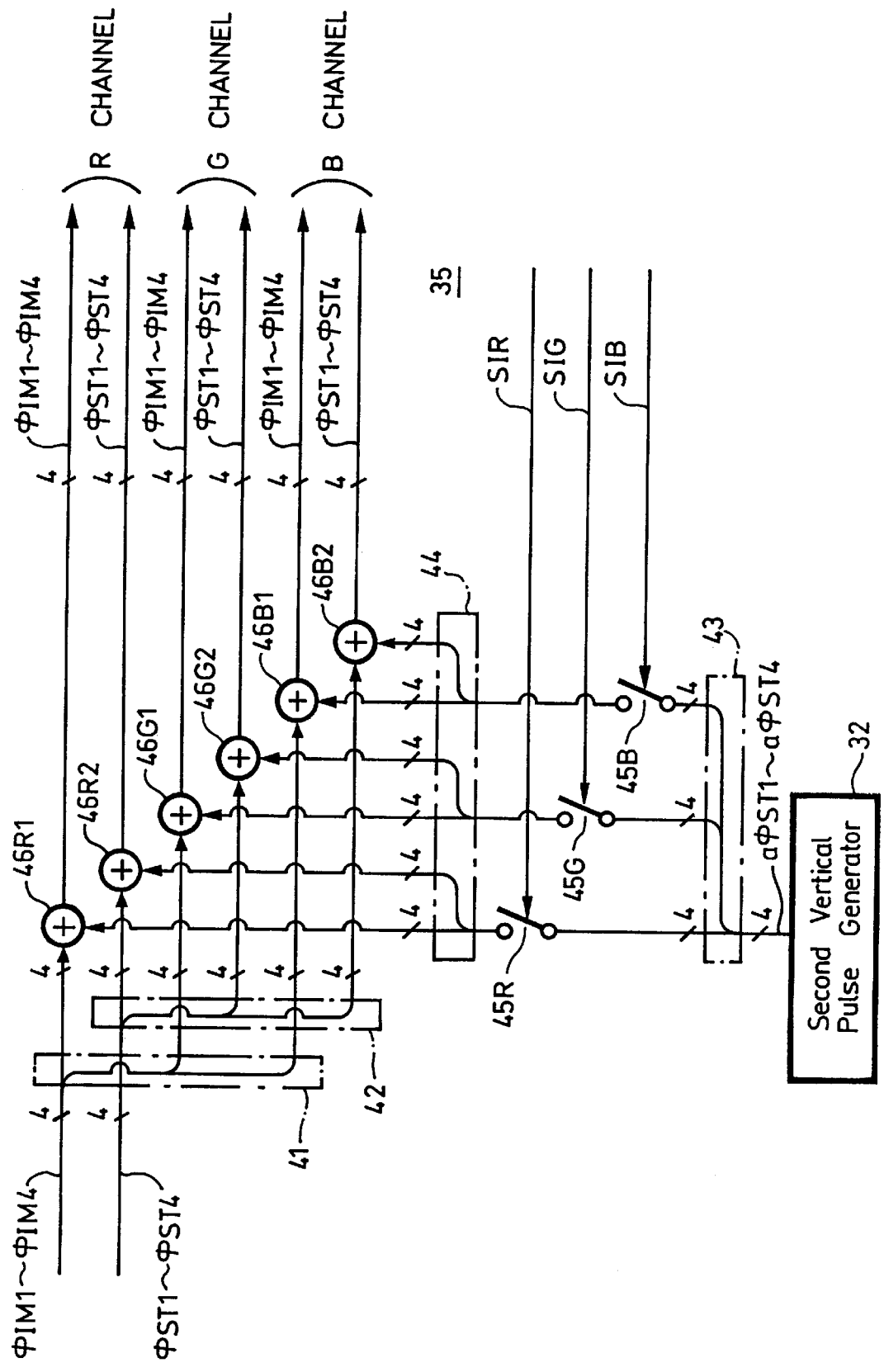
FIG. 9 is a block diagram showing an arrangement of a synthesizing circuit of the phase control circuit of the first inventive video camera.

As shown in FIG. 9, the synthesizing circuit 35 includes an imager portion signal branching line 41 for branching, into units of four lines, the imager vertical transfer pulses (four lines) φIM1 to φIM4 supplied thereto from the vertical transfer pulse generator 24. The synthesizer circuit also includes a storage portion signal branching line 42 for branching, into units of four lines, the storage portion vertical transfer pulses (four lines) φST1 to φST4 supplied thereto from the vertical transfer pulse generator 24 to provide the vertical transfer pulses for the respective solid-state imaging devices (for R, G and B-channels). The synthesizer circuit 35 also includes a first signal branching line 43 for branching, into units of four lines, the additional vertical transfer pulses (four lines) aφST1 to aφST4 to provide vertical transfer pulses for the respective solid-state imaging devices (for R, G and B-channels). The synthesizer circuit 35 also includes a second signal branching line 44 for branching the additional vertical transfer pulses (four lines) aφST1 to aφST4 branched by the first signal branching line 43 to provide vertical transfer pulses for the imager portion 3 and the storage portion 5.

Further, the synthesizing circuit 35 includes three switching circuits (R-channel, G-channel and B-channel switching circuits 45R, 45G and 45B) connected between the first and second signal branching lines 43 and 44. The switching circuits 45R, 45G and 45B are supplied with selection signals (R selection signal SIR, G selection signal SIG and B selection signal SIB) from a system controller (not shown) when detail enhancement selection switches on a key operation unit (not shown) provided at the outside of the video camera are depressed by the user. Each of the switching circuits 45R, 45G and 45B is turned on when a corresponding selection signal is at logic "1" level (high level signal) and turned off when a corresponding selection signal is at logic "0" level (low level signal).

Furthermore, the synthesizing circuit 35 includes R adding circuits 46R1 and 46R2 for adding the additional vertical transfer pulses aφST1 to aφST4 (supplied thereto through the R-channel switching circuit 45R and the second signal branching line 44) to the R-channel vertical transfer pulses φIM1 to φIM4 and φST1 to φST4 when the R-channel switching circuit 45R is turned on. The synthesizing circuit 35 also includes G adding circuits 46G1 and 46G2 for adding the additional vertical transfer pulses aφST1 to aφST4 (supplied thereto through the G-channel switching circuit 45G and the second signal branching line 44) to the G-channel vertical transfer pulses φIM1 to φIM4 and φST1 to φST4 when the G-channel switching circuit 45G is turned on. The synthesizing circuit also includes B adding circuits 46B1 and 46B2 for adding the additional vertical transfer pulses aφST1 to aφST4 (supplied thereto through the B-channel switching circuit 45B and the second signal branching line 44) to the B-channel vertical transfer pulses φIM1 to φIM4 and φST1 to φST4 when the B-channel switching circuit 45B is turned on.

Figure 10:
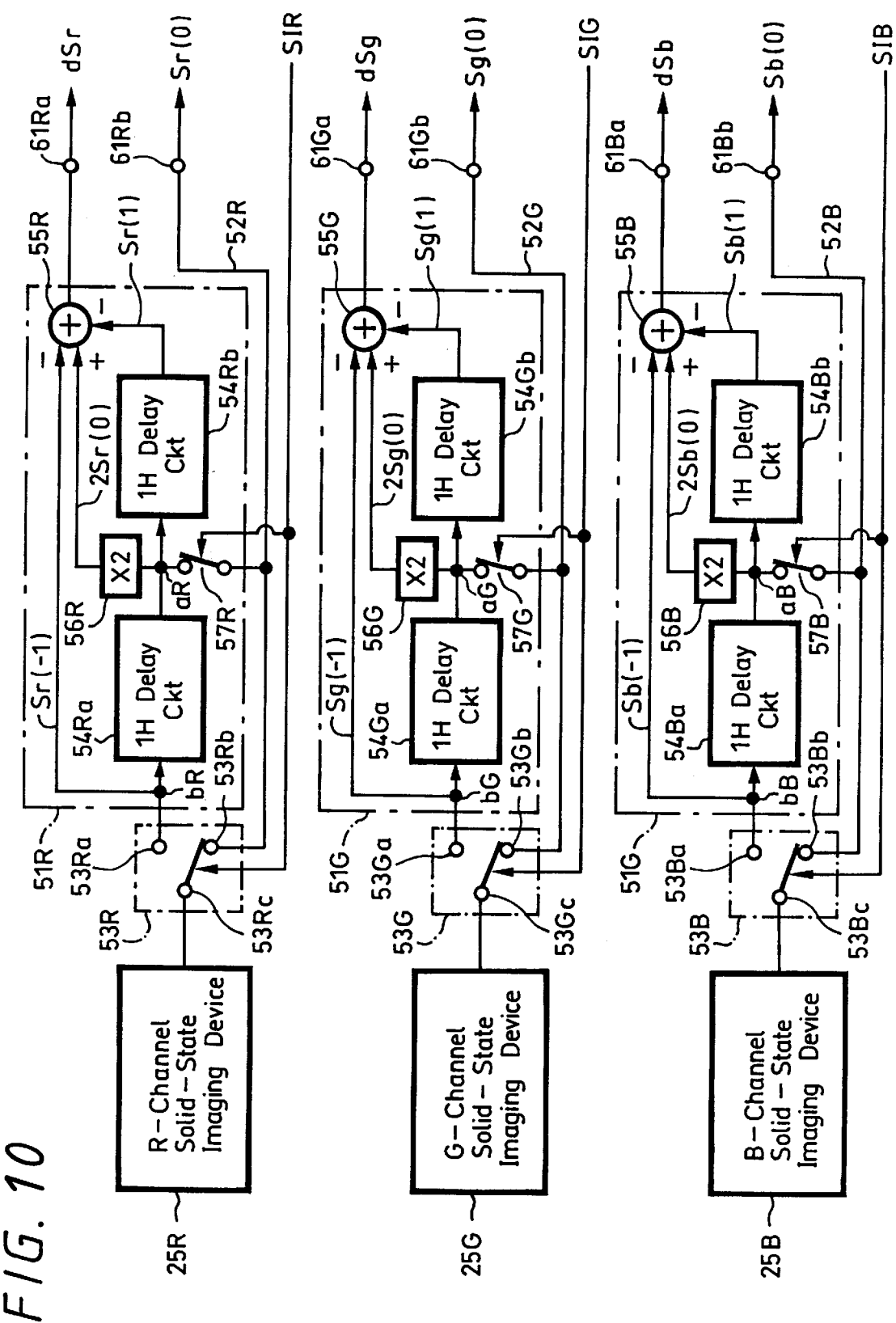
FIG. 10 is a block diagram showing an arrangement of a detail-enhancement processing circuit of the first inventive video camera.

The detail enhancement processing circuit will be described with reference to FIG. 10. As shown in FIG. 10, the detail enhancement processing circuit is composed of detail enhancement circuits 51R, 51G, 51B and main lines 52R, 52G, 52B. The detail enhancement circuits 51R, 51G, 51B and main lines 52R, 52G, 52B are disposed in parallel to one another in respective response to the output signal lines of the solid-state imaging devices 25R, 25G and 25B. Between the solid-state imaging devices 25R, 25G, 25B and the parallel detail enhancement circuits 51R, 51G, 51B and main lines (52R, G, B) are first switching circuits 53R, 53G and 53B. The first switching circuits 53R, 53G and 53B have:

(1) first fixed contacts 53R*a*, 53G*a* and 53B*a* connected to the input sides of the detail enhancement circuits 51R, 51G and 51B, (2) second fixed contacts 53R*b*, 53G*b* and 53B*b* connected to the input sides of the main signal lines 52R, 52G and 52B, and (3) movable contacts 53R*c*, 53G*c* and 53B*c* connected to the output sides of the solid-state imaging devices 25R, 25G and 25B.

The detail enhancement circuits 51R, 51G and 51B each include two 1H delay circuits {circuits for delaying a signal by one horizontal scanning period: first 1H delay circuits (54R*a*, 54G*a* and 54B*a*) and second 1H delay circuits (54R*b*, 54G*b* and 54B*b*)} connected in series the detail enhancement circuits 51R, 51G and 51B also each include 3-input adding circuits 55R, 55G and 55B. The detail enhancement circuits 51R, 51G and 51B also each include amplifiers 56R, 56G and 56B (with gain–2) connected between contacts aR, aG and aB between the first 1H delay circuits (54R*a*, 54G*a* and 54B*a*) and the second 1H delay circuits (54R*b*, 54G*b* and 54B*b*) and the 3-input adding circuits 55R, 55G and 55B.

Further, second switching circuits 57R, 57G and 57B have movable contacts connected to the main signal lines 52R, 52G and 52B and fixed contacts connected to the detail enhancement circuits 51R, 51G and 51B. The second switching circuits 57R, 57G and 57B are respectively connected between contacts aR, aG and aB of the detail enhancement circuits 51R, 51G and 51B and the main signal lines 52R, 52G and 52B.

The first and second switching circuits 53R, 53G, 53B, 57R, 57G and 57B are supplied with the selection signals SIR, SIG and SIB output from the system controller (not shown) when the detail enhancement selection switches on the key operation unit are operated. The first switching circuits 53R, 53G and 53B electrically connect the movable contacts 53R$c$, 53G$c$ and 5B$c$ to the first fixed contacts 53R$a$, 53G$a$ and 53B$a$ when the corresponding selection signals SIR, SIG and SIB are at logic "1" level (high level signals). The first switching circuits 53R, 53G and 53B electrically connect the movable contacts 53R$c$, 53G$c$ and 53B$c$ to the second fixed contacts 53R$b$, 53G$b$ and 53B$b$ when the corresponding selection signals SIR, SIG and SIB are at logic "0" level (low level signals).

The second switching circuits 57R, 57G and 57B are turned on when the corresponding selection signals SIR, SIG and SIB are at logic "1" level (high level signals) and turned off when the corresponding selection signals SIR, SIG and SIB are at logic "0" level (low level signals). In actual practice, the first and second switching circuits 53R, 53G, 53B, 57R, 57G and 57B can be formed of analog switches made of some suitable transistors, such as NMOS-FET and PMOSFET.

Operation of this video camera, in particular, detail enhancement processing operation will be described with reference to FIG. 11. For example, when the operator selects switches or buttons "R" and "G" of the detail enhancement selection switches on the key operation unit, then the R signal Sr and the G signal Sg from the R-channel and G-channel solid-state imaging devices 25R and 25G will undergo detail enhancement processing. Concurrently therewith, of the switching circuits 45 in the synthesizing circuit 35 shown in FIG. 9, the R-channel and G-channel switching circuits 45R and 45G are turned on and the B-channel switching circuit 45B is turned off.

Also, in the detail enhancement processing circuit, when switches or buttons "R" and "G" are selected, the first switching circuits 53R and 53G corresponding to the R-channel and G-channel solid-state imaging devices 25R and 25G select the detail enhancement circuits 51R and 51G and the second switching circuits 57R and 57G are turned on. On the other hand, the first switching circuit 53B corresponding to the B-channel solid-state imaging device 25B selects the main signal line 52B and the second switching circuit 57B is turned off.

For example, in this state, when the cameraman starts taking a picture of an object, signal charges corresponding to an intensity of incident light from the object are accumulated in a number of light-receiving portions 1 in the imager portions 3 of the solid-state imaging devices 25R, 25G and 25B during the charge accumulation period TD. During the charge accumulation period TD, electronic shutter pulses are supplied to substrates of the solid-state imaging devices 25R, 25G and 25B to discharge the accumulated signal charges to the substrate sides. Then, signal charges corresponding to an intensity of incident light from the object are accumulated during an exposure period TC ranging from a time point at which the last electronic shutter pulse is applied to a time point at which the next read pulse is applied. The electronic shutter pulse is applied in order to avoid a residual image. This technique is well known and therefore need not be described in detail.

During the following read period TR, the read pulse Pr supplied from the vertical pulse generator 24 is applied to the solid-state imaging devices 25R, 25G and 25B to read signal charges from the light-receiving portions 1 to the vertical registers 2. During the next frame shift period TFS, the frame shift vertical transfer pulses φIM1 to φIM4 and φST1 to φST4 are respectively supplied to the imager portion 3 and the storage portion 5 to transfer at a high speed signal charges accumulated in the vertical registers 2 of the imager portion 3 to the vertical registers 4 of the storage portion 5.

Before the first horizontal sync signal HD (horizontal blanking period HBLK) is supplied after the frame shift period TFS had elapsed, the counting circuit 31 in the phase control circuit 27 outputs the start timing signal Ss and the second vertical transfer pulse generator 32 generates the additional vertical transfer pulses aφST1 to aφST4 in synchronism with the start timing signal Ss. In this case, because the R-channel and G-channel switching circuits 45R and 45G are turned on, the additional vertical transfer pulses aφST1 to aφST4 output from the second vertical transfer pulse generator 32 are added to the R-channel and G-channel vertical transfer pulses φIM1 to φIM4 (φST1 to φST4) by the adding circuits 46R1, 46R2, 46G1 and 46G2, respectively. Therefore, additional vertical transfer pulses aφST1 to aφST4 are supplied to the R-channel and G-channel solid-state imaging devices 25R and 25G earlier than the predetermined timing.

Figure 11:
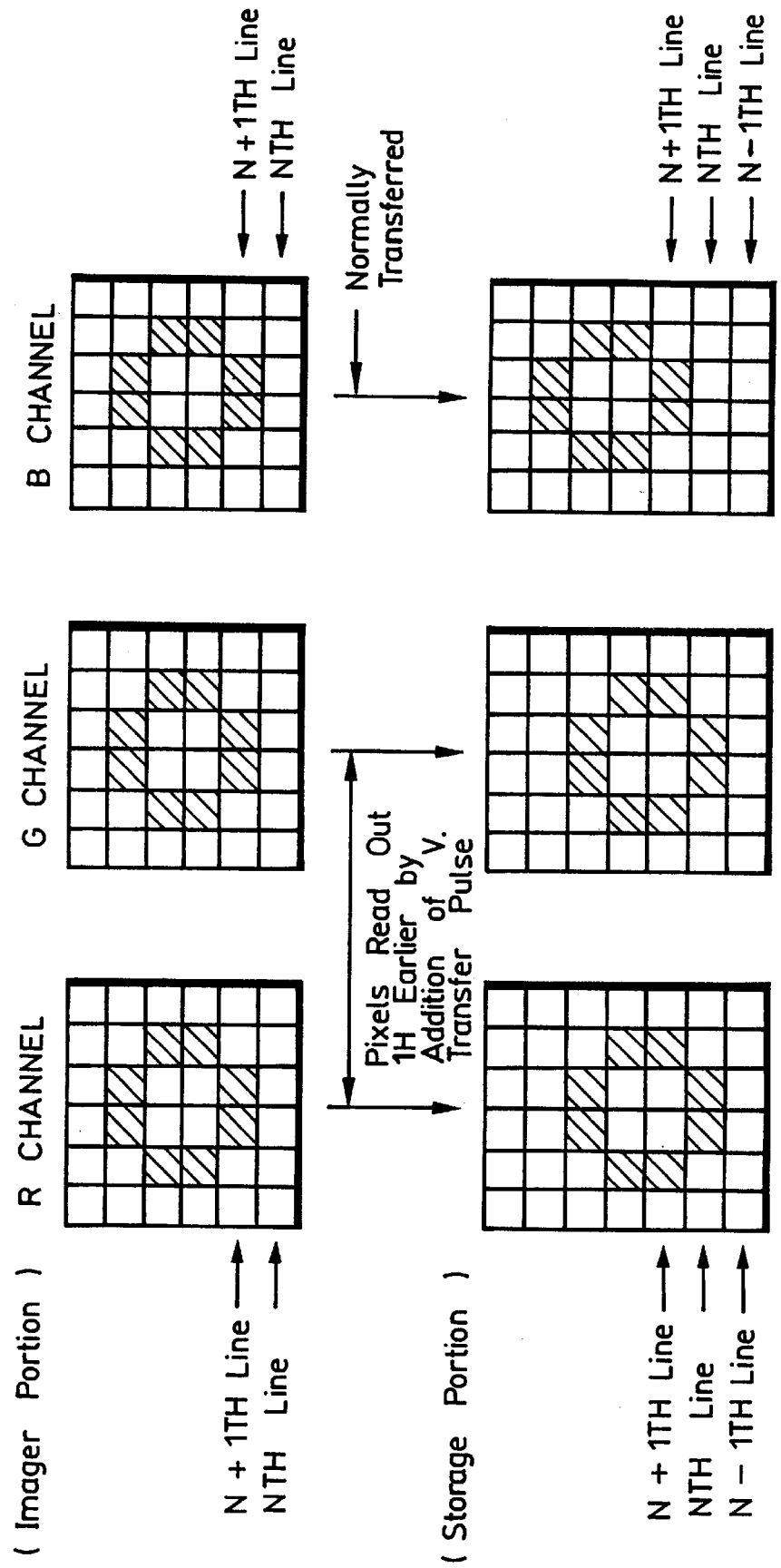
FIG. 11 is a schematic diagram showing charge transferred states of three solid-state imaging devices mounted on the first inventive video camera.

Consequently, as shown in FIG. 11, the transfer of signal charge in the amount of one line has already been finished in the R-channel and G-channel solid-state imaging devices 25R and 25G before the first horizontal sync signal HD is supplied after the frame shift period has elapsed. Thus, the signal charge accumulated states in the storage portions 5 of the solid-state imaging devices 25R, 25G and 25B are transferred such that the signal charge accumulated states of the R-channel and G-channel solid-state imaging devices 25R and 25G are shifted by one line to the horizontal register side as compared with that of the B-channel solid-state imaging device 25B.

Specifically, when a mark is picked up in the imager region at a position ranging from N+1th line to N+4th line of the imager portions 3 of the solid-state imaging devices 25R, 25G and 25B, the mark is transferred to the storage portions 5 as it is during the next frame shift period TFS, i.e., a signal charge corresponding to the mark is transferred to and accumulated in the N+1th line to the N+4th line of the storage portion 5.

Then, before the first horizontal sync signal HD is supplied, the additional vertical transfer pulses aφST1 to aφST4 from the second vertical transfer pulse generator 32 are supplied to the R-channel and G-channel solid-state imaging devices 25R and 25G to vertically transfer signal charges in the amount of one line. Therefore, the signal charge corresponding to the mark is transferred to and accumulated in the Nth line to N+3th line of the storage portions 5 of the two solid-state imaging devices 25R and 25G. At that time, the signal charge corresponding to the mark is still accumulated in N+1th line to N+4th line of the storage portion 5 of the B-channel solid-state imaging device 25B.

At this stage, the above-mentioned processing operation causes an effect equivalent to that achieved by the RGB pixel shift method (under the RG detail). Namely, the R-channel and G-channel solid-state imaging devices 25R and 25G are shifted by one line from the B-channel solid-state imaging device.

Therefore, during the next horizontal scanning period TS, the vertical transfer pulses φIM1 to φIM4 (φST1 to φST4) from the vertical transfer pulse generator 24 are sequentially supplied to the solid-state imaging devices 25R, 25G and 25B, whereby signal charges accumulated in the storage portions 5 are sequentially transferred at the unit of one row to the horizontal register H side in synchronism with the horizontal blanking period HBLK. At that time, image data of images picked up by the R-channel and G-channel solid-state imaging devices 25R and 25G are read out earlier than image data of image picked up by the B-channel solid-state imaging device 25B. That is, the R-channel and G-channel solid-state imaging devices 25R and 25G output −1H signals relative to the output signal of the B-channel solid-state imaging device 25B.

In other words, simultaneously, the B-channel solid-state imaging device 25B outputs a B signal Sb of 0H, the R-channel solid-state imaging device 25R outputs a R signal Sr of −1H and the G-channel solid-state imaging device 25G outputs a G signal Sg of −1H.

The R signal Sr (−1H), the G signal Sg (−1H) and the B signal Sb (0H) are supplied to the detail enhancement processing circuits 51R, 51G and 51B of the rear stage. The first switching circuits 53R and 53G select the detail enhancement circuits 51R and 51G with respect to the R-channel and the G-channel and the first switching circuit 53B selects the main signal line 52B with respect to the B-channel. In this way, two signals, the R signal Sr and the G signal Sg, are respectively processed by the detail enhancement processing circuits 51R and 51G.

Specifically, the R signal Sr(−1) of −1H is supplied to the first 1H delay circuit 54Ra of the preceding stage concerning the R-channel through the first switching circuit 53R and the contact bR of the preceding stage from the R-channel solid-state imaging device 25R. The R signal Sr(0) of 0H from the first 1H delay circuit 54Ra is supplied to the second 1H delay circuit 54Rb. The R signal Sr(−1) of −1H from the contact bR, the R signal 2Sr(0) of 0H whose signal level was amplified by a factor of two by the amplifier 56R and the R signal Sr(1) from the second delay circuit 54Rb are supplied to the 3-input adding circuit 55R. Then, the 3-input adding circuit 55R calculates 2Sr(0)−(Sr(−1)+Sr(1)) to deliver the R signal dSr having an emphasized contour at the output terminal 61Ra of the 3-input adding circuit 55R. The normal R signal Sr(0) is delivered to the output terminal 61Rb of the main signal line 52R from the contact aR through the second switching circuit 57R and the main signal line 52R.

In the G-channel, similarly, the G signal Sr(−1) of −1H is supplied to the first 1H delay circuit 54Ga of the preceding stage through the first switching circuit 53G and the contact bG of the preceding stage from the G-channel solid-state imaging device 25G. The G signal Sg(0) of 0H from the first 1H delay circuit 54Ga is supplied to the second 1H delay circuit 54Gb. The G signal Sg(−1) of −1H from the contact bG and the G signal 2Sg(0) of 0H whose signal level was amplified by a factor of two by the amplifier 56G are supplied to the 3-input adding circuit 55G. Further, the G signal Sg(1) of 1H from the second delay circuit 54Gb also is supplied to the 3-input adding circuit 55G. Then, the 3-input adding circuit 55G calculates 2Sg(0)−(Sg(1)+Sg(1)) to deliver the G signal dSg having an emphasized contour at the output terminal 61Ga of the 3-input adding circuit 55G. The normal G signal Sg(0) is delivered to the output terminal 61Gb through the second switching circuit 57G and the main signal line 52G from the contact aG.

In the B-channel, the normal B signal Sb(0) of 0H from the B-channel solid-state imaging device 25B is supplied through the first switching circuit 53B to the main signal line 52B and not processed by the detail enhancement circuit 51B so that the B signal Sb(0) of 0H is delivered from the output terminal 61B of the main signal line 52B without detail enhancement (i.e., contour emphasis). The 3-input adding circuit 55B outputs at its output terminal 61Ba an inactive signal component, (e.g., a signal of zero level) because the second switching circuit 57B is turned off.

As described above, according to the detail enhancement circuits 51R, 51G and 51B the R signal dSr and the G signal dSg whose contours were emphasized are delivered from the R-channel and G-channel output terminals 61Ra and 61Ga. Moreover, the normal R signal Sr, G signal Sg and B signal Sb (R signal of 0H, G signal of 0H and B signal of 0H) are delivered from the output terminals 61Rb, 61Gb and 61Bg of the main signal lines 52R, 52G and 52B. Therefore, it becomes possible to compensate for deterioration in response in the high frequency bands of the solid-state imaging devices 25R, 25G and 25B.

When it is desired that only the G signal Sg output from the G-channel solid-state imaging device 25G processed by the detail: enhancement circuitry, this can be accomplished by selecting only "G" of the detail enhancement selection switches on the key operation unit. Specifically, when the operator selects only "G" of the detail enhancement selection switches, then among the switching circuits 45R, 45G and 45B in the synthesizing circuit 35, only the G-channel switching circuit 45G is turned on, while the R-channel and B-channel switching circuits 45R and 45B are turned off. Furthermore, in the detail enhancement processing circuits 51R, 51G and 51B, only the first switching circuit 53G corresponding to the G-channel solid-state imaging device 25G selects the detail enhancement circuit 51G and only the second switching circuit 57G of the G-channel is turned on. On the other hand, the first switching circuits 53R and 53B corresponding to the R-channel and B-channel solid-state imaging devices 25R and 25B select the main signal lines 52R and 52B and the second switching circuits 57R and 57B are turned off.

As a result, the additional vertical transfer pulses aφST1 to aφST4 are supplied to the G-channel solid-state imaging device 25G to cause the G-channel solid-state imaging device 25G to output the G signal of −1H. The R-channel and B-channel solid-state imaging devices 25R and 25B output the normal R signal Sr of 0H and the normal B signal Sb of 0H.

Consequently, the detail enhanced signal dSg is output from the output terminal 61Ga of the G-channel detail enhancement circuit 51G, while inactive signal components are output from the output terminals 61Ra and 61Ba of the R-channel and B-channel detail enhancement circuits 51R and 51B. The R signal Sr of 0H, the G signal Sg of 0H and the B signal of Sb of 0H are output from the main signal lines 52R, 52G and 52B, respectively.

As described above, according to the first inventive video camera, when the solid-state imaging devices 25R, 25G and 25B are fixed to the dichroic prism such that the centers of the imager regions of the solid-state imaging devices 25R, 25G and 25B are aligned with optical axes of their corresponding colors, then it becomes possible to realize detail enhancement similar to that of the RGB image shift method. Therefore, when the solid-state imaging devices 25R, 25G and 25B are fixed to the dichroic prism at the these positions, a target solid-state imaging device, whose output color signal is to be processed by the detail enhancement processing circuitry, can output a color signal at a timing of −1H. Thus, without using the mechanical RGB image shift method, it is possible to easily obtain a detail enhanced signal by the detail enhancement processing circuitry described above.

Accordingly, the solid-state imaging devices 25R, 25G and 25B can all be bonded to the dichroic prism at the positions corresponding to the same phase with respect to the vertical direction, irrespective of the kinds of the detail forms which may be subsequently desired. Further, the CCD blocks can be made in common, irrespective of the kinds of the detail forms which may be subsequently desired. Therefore, CCD blocks corresponding to the different kinds of the detail forms need not be made. In addition, it becomes possible to omit the positioning process in which a very small displacement corresponding to one line of the imager region is determined and the bonded positions of the solid-state imaging devices are shifted from the reference position in accordingly. Thus, the manufacturing process can be simplified, the number of processes can be reduced and the manufacturing costs can be reduced.

Furthermore, even when the solid-state imaging device whose color signal should be enhanced in detail is changed in accordance with the later change of specification or by user's preference, the additional vertical transfer pulses a$\phi$ST1 to a$\phi$ST4 from the second vertical transfer pulse generator 32 can easily be added to the vertical transfer pulse $\phi$IM1 to $\phi$IM4 ($\phi$ST1 to $\phi$ST4) supplied to the changed solid-state imaging device by changing the selection signals SIR, SIG and SIB input from the system controller (not shown) and energized by the detail enhancement selection switches on the key operation portion. Therefore, the color signal detail enhancement processing under various kinds of detail forms can be easily accomplished.

Accordingly, it becomes possible for the user to easily change the form of the detail enhancement processing in accordance with the object, background or user's preference. Also, it is possible to extend a range in which the user can select image processing functions.

A second inventive video camera will be described below with reference to FIGS. 12 to 14. In the second inventive video camera, like parts corresponding to those of the first inventive video camera are marked with the same reference numerals and therefore need not be described in detail.

Figure 12:
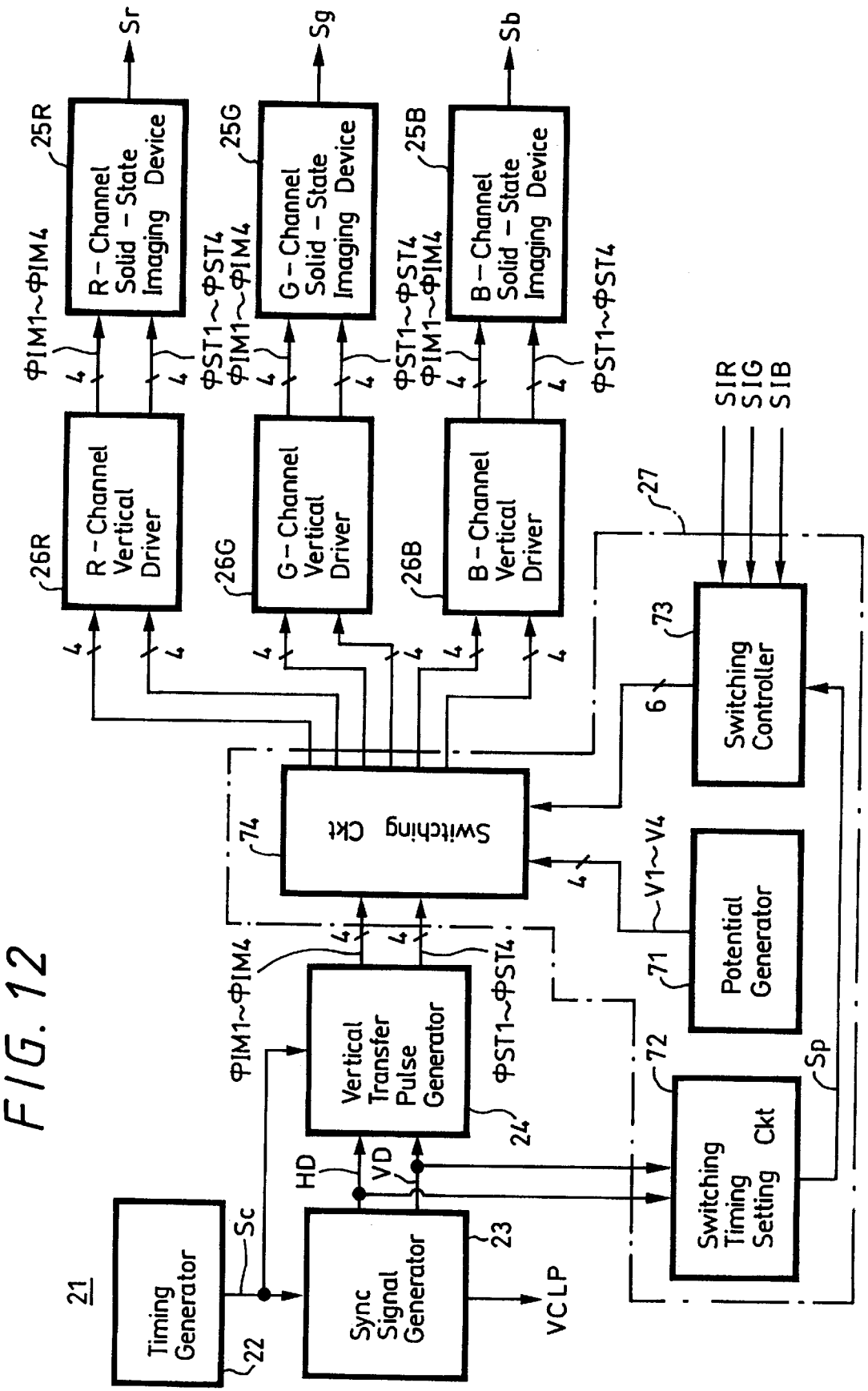
FIG. 12 is a block diagram showing an arrangement of a pulse generating circuit system of a second embodiment of the present invention in which the camera apparatus is applied to a 3-chip color video camera having FIT (frame interline transfer) system CCD solid-state imaging devices (this video camera will hereinafter be referred to as "second inventive video camera")

As shown in FIG. 12, the second inventive video camera is of substantially the same arrangement as that of the first inventive video camera. The second inventive video camera differs from the first inventive video camera in that the phase control circuit 27 includes a potential generator 71 for generating transfer standby potentials V1 to V4 which do not contribute to the vertical transfer. The second inventive video camera also has a switching timing setting circuit 72 for setting a switching timing signal Sp on the basis of the horizontal sync signal HD and the vertical sync signal VD supplied thereto from the sync signal generator 23. The second inventive video camera also has a switching circuit 74 for switching between vertical transfer pulses free from the detail enhancement of the vertical transfer pulses $\phi$IM1 to $\phi$IM4 supplied thereto from the vertical transfer pulse generator 24 and the transfer standby potentials V1 to V4 on the basis of a control signal supplied thereto from a switching controller circuit 73.

The potential generator 71 generates the potentials V1 to V4 applied as the vertical transfer pulse and outputs a predetermined high level potential V1, a predetermined high level potential V2, a predetermined low level potential V3 and a predetermined low level potential V4 to first, second, third and fourth signal lines extended as output lines.

The switching timing setting circuit 72 counts the horizontal sync signals HD and the vertical sync signals VD supplied thereto from the sync signal generator 23. The switching timing setting circuit 72 outputs the switching timing signal Sp when the count value reaches a value corresponding to the first horizontal sync signal HD supplied after the frame shift period TFS has elapsed. For example, the switching timing signal Sp has a signal waveform of high level only during the period equivalent to the horizontal blanking period HBLK. This switching timing signal Sp is supplied to the switching control circuit 73.

Figure 13:
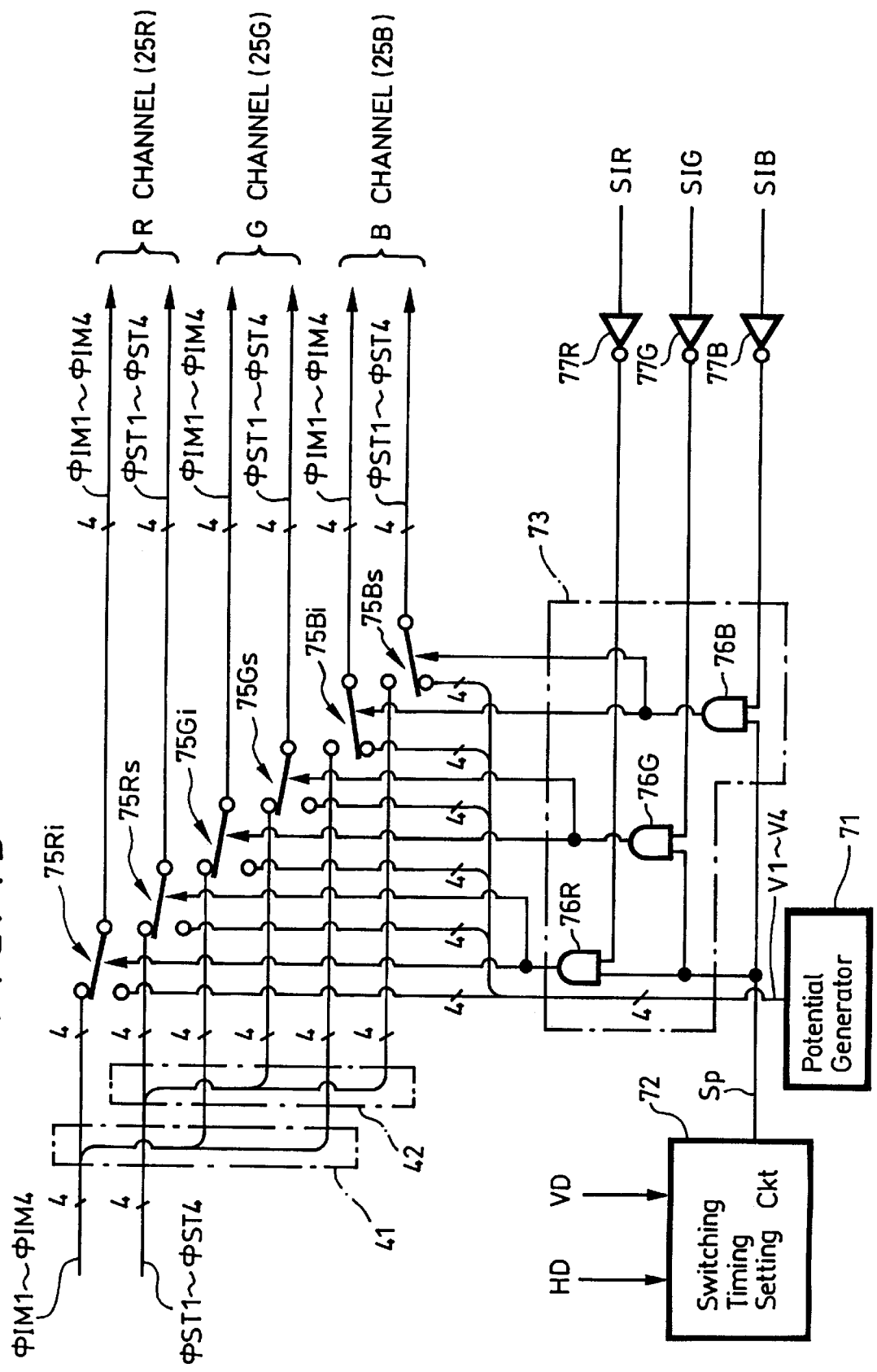
FIG. 13 is a circuit diagram showing an arrangement of a switching circuit of a phase control circuit of the second inventive video camera.

As shown in FIG. 13, the switching circuit 74 includes the two signal branching lines 41, 42 shown in connection with the first inventive video camera and switching circuit groups connected to vertical transfer pulse supplying lines disposed every four lines. These switching circuit groups are operated under the control of the switching control circuit 73. Generally speaking, the switching circuit groups are composed of two kinds of switching circuit groups (first switching circuit group and second switching circuit group).

The first switching circuit group includes a first switching circuit 75R$i$ for the R-channel. First switching circuit 75R$i$ is connected to a vertical transfer pulse supplying line extended to the imager portion 3 of the R-channel solid-state imaging device 25R. Its first contact is connected to the signal branching line 41 side, its second contact is connected to the potential generator 71 side and its movable contact is connected to the solid-state imaging device 25R side. A first switching circuit 75G$i$ for the G-channel is connected to a vertical transfer pulse supplying line extended to the imager portion 3 of the G-channel solid-state imaging device 25G. Its first fixed contact is connected to the signal branching line 41 side, its second fixed contact is connected to the potential generator 71 side, and its movable contact is connected to the solid-state imaging device 25G side. A first switching circuit 75B$i$ for the B-channel is connected to a vertical transfer pulse supplying line extended to the imager portion 3 of the B-channel solid-state imaging device 25B. Its first fixed contact is connected to the signal branching line 41 side, its second fixed contact is connected to the potential generator 71 side, and its movable contact is connected to the solid-state imaging device 25B side.

The second switching circuit group includes a second switching circuit 75R$s$ for the R-channel. The second switching circuit 75R$s$ is connected to a vertical transfer pulse supplying line extended to the storage portion 5 of the R-channel solid-state imaging device 25R. Its first fixed contact is connected to the signal branching line 42 side, its second fixed contact is connected to the potential generator 71 side and its movable contact is connected to the solid-state imaging device 25R. A second switching circuit 75G$s$ for the G-channel is connected to a vertical transfer pulse supplying line extended to the storage portion 5 of the G-channel solid-state imaging device 25G. Its first fixed contact is connected to the signal branching line 42 side, its second fixed contact is connected to the potential generator 71 side and its movable contact is connected to the solid-state imaging device 25G. A second switching circuit 75B$s$ for the B-channel is connected to a vertical transfer pulse supplying line extended to the storage portion 5 of the B-channel solid-state imaging device 25B. Its first fixed contact is connected to the signal branching line 42 side, its second fixed contact is connected to the potential generator 71 side and its movable contact is connected to the solid-state imaging device 25B side.

The switching control circuit 73 includes three 2-input AND circuits (AND circuit 76R for R-channel, AND circuit 76G for G-channel AND circuit 76B for B-channel). The AND circuits 76R, 76G and 76B are interconnected such that the switching timing signal Sp from the switching timing setting circuit 72 is input to one input terminal of each of the AND circuits 76R, 76G and 76B. The R-channel selection signal SIR, the G-channel selection signal SIG and the B-channel selection signal SIB from the system controller (not shown) are input to the other input terminals of the AND circuits 76R, 76G and 76B through inverters 77R, 77G and 77B, respectively. Each of the AND circuits 76R, 766 and 76B outputs an ON signal of logic "1" level (high level) when the switching timing signal Sp is at logic "1" level (high level) and the corresponding selection signal is at logic "1" level (high level).

The switching circuits 75R$i$, 75G$i$, 75B$i$, 75R$s$, 75G$s$ and 75B$s$ electrically connect the movable contacts to the second fixed contacts in response to the ON signal input thereto from the switching control circuit 73 and electrically connect the movable contacts to the first fixed contacts in response to an OFF signal input thereto from the switching control circuit 73.

As an example, suppose that the user selects the detail enhancement selection switches "R" and "G" on the key operation unit. The R-channel selection signal SIR and the G-channel selection signal SIG go to a high level to supply a signal of high level to the other input terminal of the B-channel AND circuit 76B and a signal of low level to the other input terminals of the R-channel AND circuit 76R and the G-channel AND circuit 76G. Under this condition, when the switching timing signal Sp of high level is supplied to the input terminals of the AND circuits 76R, 76G and 76B from the switching timing setting circuit 72, only the B-channel AND circuit 76B will output an ON signal to cause the first and second switching circuits 75B$i$ and 75B$s$ for the B-channel to electrically connect the movable contacts to the first fixed contacts. In this way, the transfer standby potentials V1 to V4 from the potential generator 71 are supplied only to the B-channel vertical transfer pulse supplying line extended to the B-channel solid-state imaging device 25B through the switching circuits 75B$i$ and 75B$s$.

Figure 14:
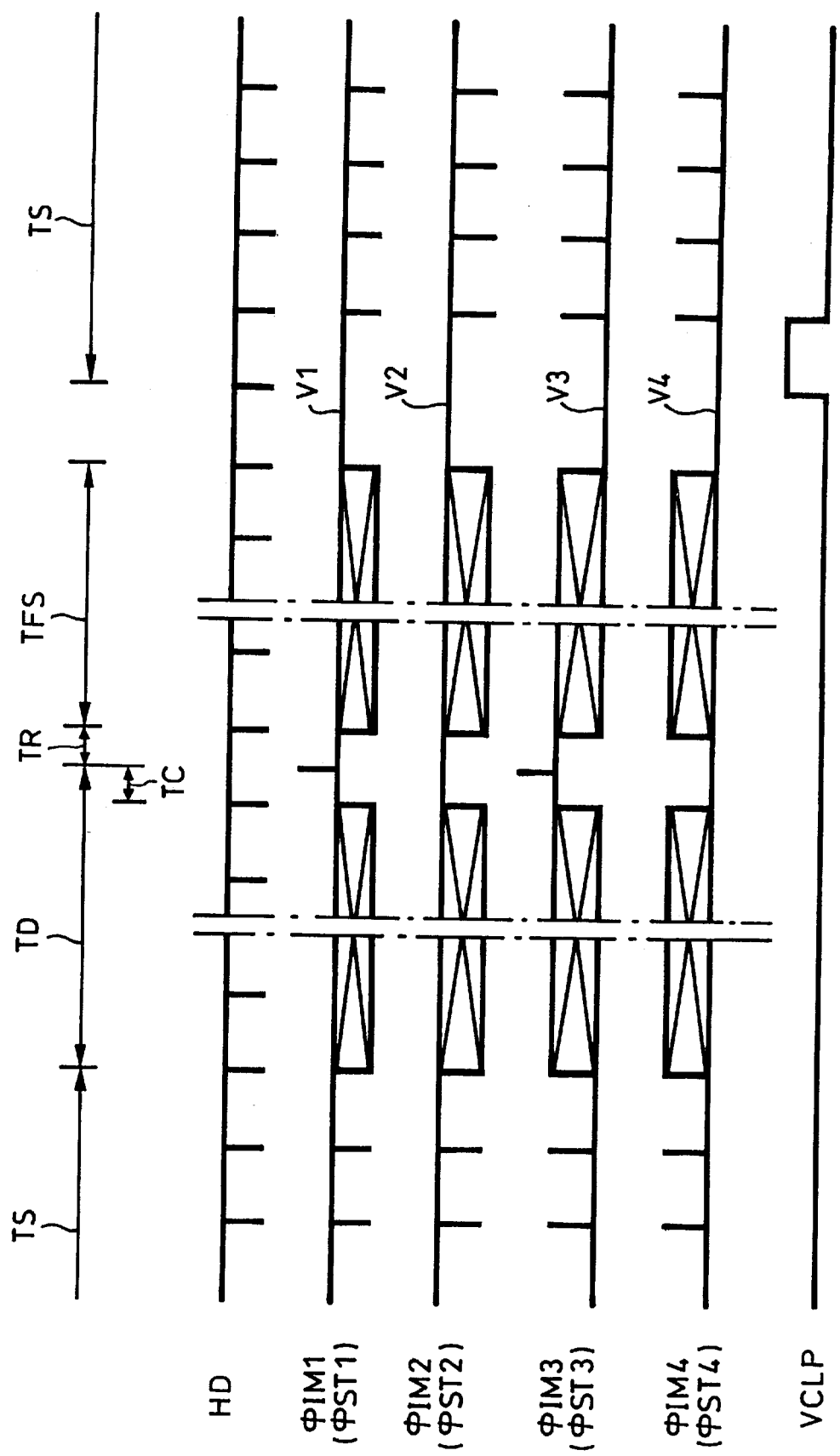
FIG. 14 is a timing chart showing examples of vertical transfer pulses applied to solid-state imaging devices, whose output is not detail-enhanced, in the second inventive video camera.

Therefore, as shown in FIG. 14, during the period of the first horizontal sync signal HD (horizontal blanking period HBLK) following the frame shift period TFS, the vertical transfer pulses $\phi$IM1 to $\phi$IM4 ($\phi$ST1 to $\phi$ST4) which contribute to the charge transfer are supplied to the R-channel and G-channel solid-state imaging devices 25R and 25G and the predetermined potentials (transfer standby potentials) V1 to V4 which do not contribute to the charge transfer are supplied to the B-channel solid-state imaging device 25B.

Specifically, the vertical transfer pulses $\phi$IM1 to $\phi$IM4 ($\phi$ST1 to $\phi$ST4) are supplied to the R-channel and G-channel solid-state imaging devices 25R and 25G earlier than the B-channel solid-state imaging device 25B. As a consequence, the charge transfer in the amount of one line is finished in the R-channel and G-channel solid-state imaging devices 25R and 25G in response to the first horizontal sync signal HD supplied after the frame shift period TFS has elapsed. Meanwhile, the B-channel solid-state imaging device 25B is placed in the charge transfer standby mode until the next horizontal sync signal HD is supplied. The signal charge accumulation states of the storage portions 5 of the solid-state imaging devices 25R, 25G and 25B are output such that the R-channel and G-channel solid-state imaging devices 25R and 25G are shifted by one line amount toward the horizontal register H side relative to the B-channel solid-state imaging device 25B.

At this stage, the above-mentioned processing brings about an effect similar to the mechanical RGB image shift method. Namely, the R-channel and G-channel solid-state imaging devices 25R and 25G produce signals shifted by one line from the signal of B-channel solid-state imaging device 25B.

Accordingly, during the following horizontal scanning period TS, the vertical transfer pulses $\phi$IM1 to $\phi$IM4 ($\phi$ST1 to $\phi$ST4) from the vertical transfer pulse generator 24 are sequentially supplied to the solid-state imaging devices 25R, 25G and 25B, whereby the signal charges accumulated in the storage portions 5 are sequentially transferred at the unit of one line amount to the horizontal register H side in synchronism with the horizontal sync signal HD. At that time, image data of images picked by the R-channel and G-channel solid-state imaging devices 25R and 25G are read out earlier than image data of image picked up by the B-channel solid-state imaging device 25B by one horizontal scanning period (1H). That is, the R-channel and G-channel can output signals of –1H relative to the B-channel.

In other words, simultaneously, the B-channel solid-state imaging device 25B outputs the B signal Sb of 0H, the R-channel solid-state imaging device 25R outputs the R signal Sr of –1H and the G-channel solid-state imaging device 25G outputs the G signal of –1H.

The R signal (–1H), the G signal (–1H) and the B signal (0H) are supplied to the detail enhancement processing circuit of the rear stage. In the detail enhancement processing circuit, since the detail enhancement circuits 51R and 51G are selected by the first switching circuits 53R and 53G for R-channel and G-channel and the main signal line 52B is selected by the first switching circuit 53B for B-channel, the two kinds of signals, i.e., the R signal Sr and the G signal Sg are enhanced in detail.

As described above, according to the second inventive video camera, as with the first inventive video camera, even the desired detail form of the detail enhancement varies with a change of specification or by user's preference, the vertical transfer pulses used to set the switching timing can be selectively subtracted from the vertical transfer pulses supplied to some of solid-state imaging device(s) in order to achieve the desired form of detail enhancement. This can be accomplished by changing the selection signal input from the detail enhancement selection switch in the key operation portion. Therefore, it is possible to emphasize the color signal output from arbitrary target solid-state imaging device (s) with ease.

Specifically, the user can vary the form of the detail enhancement processing with ease in accordance with the object, the background or by the user's preference. Thus, it is possible for the user to extend the width in which the user can select the image processing functions.

While the present invention has been explained with reference to first and second inventive video cameras, the present invention is not limited thereto. For instance, an IT (interline transfer) system solid-state imaging device also can be used in conjunction with the present invention.

According to a camera apparatus of the present invention, the phase control circuit includes a start timing setting circuit for setting an advanced phase start timing signal based on the horizontal synchronizing signal, the vertical synchronizing signal and the system clock. The phase control circuit also includes a second vertical transfer pulse generating circuit for generating vertical transfer pulses based on the start timing signal set by the start timing setting circuit and the system clock. The phase control circuit also includes a synthesizing circuit supplied with the vertical transfer pulses output from the vertical transfer pulse generating circuit and synthesizing the vertical transfer pulses supplied thereto from the second vertical transfer pulse generating circuit to the vertical transfer pulse supplied to the solid-state imaging device whose output color signal is to be enhanced in detail.

Therefore, even when the solid-state imaging devices are fixed to the prism at its positions corresponding to the same phase, a selected solid-state imaging device whose output color signal is to be enhanced in detail can output a color signal of −1H, a color signal of 0H and a color signal of 1H. Thus, it is possible to easily obtain the detail enhanced signal without using the mechanical RGB image shift method.

According to the camera apparatus of the present invention, the pulse generating circuit system includes signal branching circuits for branching and supplying the vertical transfer pulses from the vertical transfer pulse generating circuit to the respective solid-state imaging devices. Also, the synthesizing circuit is supplied with the vertical transfer pulses branched by the signal branching circuit and synthesizes the vertical transfer pulses supplied thereto from the second vertical transfer pulse generating circuit to the vertical transfer pulse supplied to the solid-state imaging device whose output color signal is to be detail-enhanced. Therefore, even when the solid-state imaging devices are fixed to the prism at its positions corresponding to the same phase, a selected solid-state imaging device whose output color signal is to be enhanced in detail can output a color signal of −1H, a color signal of 0H and a color signal of 1H. Thus, it is possible to easily obtain the detail enhanced signal without using the mechanical RGB image shift method. According to the camera apparatus of the present invention, since the synthesizing circuit includes selecting circuits supplied with the vertical transfer pulses from the vertical transfer pulse generating circuit to select the vertical transfer pulses synthesized to the vertical transfer pulses from the second vertical transfer pulse generating circuit based on selection signals input thereto from the outside, even when the solid-state imaging device whose output color signal is to be enhanced in detail is later changed in accordance with the change of specification or by the user's preference, it becomes possible to easily add the vertical transfer pulses from the second vertical transfer pulse generating circuit to the vertical transfer pulses supplied to the changed solid-state imaging device. Thus, a color signal output from the changed solid-state imaging device can be enhanced in detail with ease.

Further, according to another camera apparatus of the present invention, since the phase control circuit includes a potential generating circuit for generating transfer standby potentials which do not contribute to vertical transfer, a switching timing setting circuit for setting a switching timing signal based on a horizontal synchronizing signal and a vertical synchronizing signal and a switching circuit supplied with the vertical transfer pulses from the vertical transfer pulse generating circuit and switching the vertical transfer pulses supplied to the solid-state imaging devices whose output color signals are not to be detail-enhanced to the transfer standby potentials based on the switching timing signal supplied thereto from the switching timing setting circuit, even when the solid state imaging devices are fixed to the prism at positions corresponding to the same phase, the solid-state imaging device whose output color signal is to be enhanced in detail can output a color signal of −1H, a color signal of 0H and a color signal of 1H. Thus, it is possible to easily obtain the detail enhanced signal without using the mechanical RGB image shift method.

Furthermore, according to the camera apparatus of the present invention, the switching circuit includes selecting circuits supplied with the vertical transfer pulses from the vertical transfer pulse generating into be switched to the transfer 1 transfer pulses to be switched to the transfer standby potentials based on selection signals input thereto from the outside, even when the solid-state imaging device whose output color signal is to be enhanced in detail is later changed in accordance with the later change of specification or by the user's preference, it becomes possible to easily subtract the vertical transfer pulses used to set the switching timing from the vertical transfer pulses supplied to the solid-state imaging devices other than the changed solid-state imaging device only by changing the selection signal input from the outside. Thus, the color signal output from the changed solid-state imaging device can be detail-enhanced with ease.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A camera apparatus, comprising:
   a plurality of solid-state imaging devices each respectively disposed to receive a fundamental color and for respectively outputting color signals corresponding to the received fundamental colors at a timing based on a plurality of vertical transfer pulses;
   a pulse generating circuit system for supplying vertical transfer pulses to each solid-state imaging device of the plurality of solid-state imaging devices, the pulse generating circuit comprising:
   a vertical transfer pulse generating circuit for generating reference vertical transfer pulses of a reference phase based on a horizontal synchronizing signal, a vertical synchronizing signal and a system clock; and
   a phase control circuit, supplied with the reference vertical transfer pulses, for supplying advanced phase vertical transfer pulses relative to the vertical transfer pulses of the reference phase, to at least one of the solid-state imaging devices, said phase control circuit including:
     a start timing setting circuit for setting an advanced phase start timing signals based on said horizontal synchronizing signal, said vertical synchronizing signal and said system clock;
     a second vertical transfer pulse generating circuit for generating the advanced phase vertical transfer pulses based on the advanced phase start timing signals; and
     a synthesizing circuit for synthesizing the reference vertical transfer pulses and the advanced phase vertical transfer pulses and for selectively supplying one of the synthesized advanced phase vertical transfer pulses and the reference vertical transfer pulses to each solid-state imaging device; and
   a detail enhancement signal generating circuit for receiving the color signals output by the plurality of solid-state imaging devices and for performing detail enhancement on the color signal received from at least one solid-state imaging device which is supplied with the advanced phase vertical transfer pulses.

2. The camera apparatus of claim 1 wherein the synthesizing circuit comprises:
   a plurality of signal branching lines, each respectively connected to a solid-state imaging device, for branching the reference vertical transfer pulses from the vertical transfer pulse generating circuit; and means for selectively adding the advanced vertical transfer pulses to at least one signal branching line of the plurality of signal branching lines which is connected to the at least one solid-state imaging device whose output is to undergo detail enhancement.

3. The camera apparatus of claim 2 wherein said detail enhancement signal generating circuit includes:

a first delay circuit for delaying a color signal output in response to the advanced phase vertical transfer pulses to produce a first delayed color signal;

a second delay circuit for delaying a color signal output in response to the advanced phase vertical transfer pulses to produce a second delayed color signal; and an adding circuit for adding the color signal, the first delayed color signal and the second delayed color signal to perform detail enhancement.

4. The camera apparatus of claim 1 wherein the synthesizing circuit comprises a selecting circuit for selecting which of the reference vertical transfer pulses and the advanced vertical transfer pulses is supplied to each of the solid-state imaging devices.

5. The camera apparatus of claim 4 wherein said detail enhancement signal generating circuit includes:

a first delay circuit for delaying a color signal output in response to the advanced phase vertical transfer pulses to produce a first delayed color signal;

a second delay circuit for delaying a color signal output in response to the advanced phase vertical transfer pulses to produce a second delayed color signal; and an adding circuit for adding the color signal, the first delayed color signal and the second delayed color signal to perform detail enhancement.

6. The camera apparatus of claim 1 wherein said detail enhancement signal generating circuit includes:

a first delay circuit for delaying a color signal output in response to the advanced phase vertical transfer pulses to produce a first delayed color signal;

a second delay circuit for delaying a color signal output in response to the advanced phase vertical transfer pulses to produce a second delayed color signal; and an adding circuit for adding the color signal, the first delayed color signal and the second delayed color signal to perform detail enhancement.

7. A camera apparatus, comprising:

a plurality of CCD's (charge coupled devices), each of the plurality of CCD's providing an image signal and having vertical transfer registers for transferring charges in response to vertical transfer pulses and a horizontal transfer register for transferring charges in response to horizontal transfer pulses;

pulse generating means for generating the vertical transfer pulses and the horizontal transfer pulses for each the plurality of CCD's, wherein a number of vertical transfer pulses for at least a first CCD of the plurality of CCD's is different from the other CCD's of the plurality of CCD's, said pulse generating means including:
first pulse generating means for generating the vertical transfer pulses;
second pulse generating means for generating additional vertical transfer pulses; and
synthesizing means for synthesizing the vertical transfer pulses from the first pulse generating means and the additional vertical transfer pulses from the second pulse generating means and for supplying the first CCD with the synthesized vertical transfer pulses; and image enhancement means supplied with the image signal from the first CCD for delaying the input image signal for one and two horizontal scanning periods to generate a first delayed image signal delayed by one horizontal scanning period from the input image signal, a second delayed image signal delayed by two horizontal scanning periods from the input image signal, and for processing the input image signal, the first delayed image signal and the second delayed image signal to generate an enhanced image signal having a phase equal to the phase of the first delayed image signal so that the phase of the enhanced image signal from the first CCD is the same as that of the image signal from the other CCD's of the plurality of CCD's.

8. The camera apparatus of claim 7 wherein the first pulse generating means generates vertical transfer pulses for all of the CCD and the synthesizing means selectively synthesizes the additional vertical transfer pulses so that the synthesized pulses are supplied to at least the first CCD.

9. The camera apparatus of claim 8 wherein each of the plurality of CCD's is a frame interline type imaging device having an imager portion and a storage portion.

10. The camera apparatus of claim 9 wherein the pulse generating means supplies the additional vertical transfer pulses to the storage portion after transferring the electronic charges from the imager portion to the storage portion.

11. The camera apparatus of claim 7, wherein each of the plurality of CCD's is a frame interline type imaging device having an imager portion and a storage portion.

12. The camera apparatus according of 11 wherein the pulse generating means supplies the additional vertical transfer pulses to the storage portion after transferring the electronic charges from the imager portion to the storage portion.

13. A method of performing detail enhancement on a plurality of color signals, comprising the steps of:

receiving a plurality of fundamental colors and respectively outputting color signals corresponding to the received fundamental colors at a timing based on a plurality of vertical transfer pulses;

supplying vertical transfer pulses, said step of supplying including the steps of:
generating reference vertical transfer pulses of a reference phase based on a horizontal synchronizing signal, a vertical synchronizing signal and a system clock; and
supplying advanced phase vertical transfer pulses relative to the vertical transfer pulses of the reference phase, said step of supplying advanced phase vertical transfer pulses including the steps of:
setting an advanced phase start timing signals based on said horizontal synchronizing signal, said vertical synchronizing signal and said system clock;
generating the advanced phase vertical transfer pulses based on the advanced phase start timing signals; and
synthesizing the reference vertical transfer pulses and the advanced phase vertical transfer pulses and for selectively providing one of the advanced phase vertical transfer pulses and the reference vertical transfer pulses; and receiving the color signals and performing detail enhancement on the color signal received from at least one solid-state imaging device which is supplied with the advanced phase vertical transfer pulses.

14. The method of claim 13 wherein the step of synthesizing includes the steps of:

branching the reference vertical transfer pulses; and selectively adding the advanced phase vertical transfer pulses to at least one of the branched reference vertical transfer pulses.

15. The method of claim 14 wherein said step of receiving the color signals and performing detail enhancement includes the steps of:

delaying a color signal output in response to the advanced phase vertical transfer pulses to produce a first delayed color signal;

delaying a color signal output in response to the advanced phase vertical transfer pulses to produce a second delayed color signal; and adding the color signal, the first delayed color signal and the second delayed color signal to perform detail enhancement.

16. The method of claim 13 wherein the step of synthesizing includes the step of selecting which of the reference vertical transfer pulses and the advanced vertical transfer pulses for performing detail enhancement.

17. The method of claim 16 wherein said step of receiving the color signals and performing detail enhancement includes the steps of:

delaying a color signal output in response to the advanced phase vertical transfer pulses to produce a first delayed color signal;

delaying a color signal output in response to the advanced phase vertical transfer pulses to produce a second delayed color signal; and adding the color signal, the first delayed color signal and the second delayed color signal to perform detail enhancement.

18. The method of claim 13 wherein said step of receiving the color signals and performing detail enhancement includes the steps of:

delaying a color signal output in response to the advanced phase vertical transfer pulses to produce a first delayed color signal;

delaying a color signal output in response to the advanced phase vertical transfer pulses to produce a second delayed color signal; and adding the color signal, the first delayed color signal and the second delayed color signal to perform detail enhancement.

19. A method of performing detail enhancement on a plurality of color signals, comprising the steps of:

providing a plurality of image signals and transferring charges in response to vertical transfer pulses and horizontal transfer pulses;

generating the vertical transfer pulses and the horizontal transfer pulses for each image signal wherein a number of vertical transfer pulses for at least a first image signal is different from that of the other image signals, said step of generating including the steps of:

generating the vertical transfer pulses;

generating additional vertical transfer pulses; and synthesizing the vertical transfer pulses and the additional vertical transfer pulses and supplying the synthesized vertical transfer pulses;

delaying the input image signal for one and two horizontal scanning periods to generate a first delayed image signal delayed by one horizontal scanning period from the input image signal, a second delayed image signal delayed by two horizontal scanning periods from the input image signal; and processing the input image signal, the first delayed image signal and the second delayed image signal to generate an enhanced image signal having a phase equal to the phase of the first delayed image signal such that the phase of the enhanced image signal corresponding to the first image signal is the same as that of the other image signals.

20. The method claim 19 wherein said step of generating the vertical transfer pulses includes the step of generating vertical transfer pulses for all of the image signals and wherein said step of synthesizing the vertical transfer pulses includes selectively synthesizing the additional vertical transfer pulses to supply the synthesized pulses corresponding to at least the first image signal.

* * * * *